United States Patent [19]
Kang

[11] Patent Number: 5,956,185
[45] Date of Patent: Sep. 21, 1999

[54] COMPACT CAMERA ZOOM LENS SYSTEM

[75] Inventor: Geon-Mo Kang, Kyeongsangnam-do, Rep. of Korea

[73] Assignee: Samsung Aerospace Industries, Ltd., Kyeongsangnam-do, Rep. of Korea

[21] Appl. No.: 08/970,499

[22] Filed: Nov. 14, 1997

[51] Int. Cl.[6] .................................................. G02B 15/14
[52] U.S. Cl. .......................................... 359/689; 359/676
[58] Field of Search ..................................... 359/689, 676, 359/657, 754, 755, 779, 780, 784, 791, 813

[56] References Cited

U.S. PATENT DOCUMENTS

| | | |
|---|---|---|
| 4,854,682 | 8/1989 | Yamanashi . |
| 4,978,204 | 12/1990 | Ito . |
| 5,148,321 | 9/1992 | Goto et al. . |

FOREIGN PATENT DOCUMENTS

| | | |
|---|---|---|
| 2-37317 | 2/1990 | Japan . |
| 2-201410 | 8/1990 | Japan . |

*Primary Examiner*—Hung Xuan Dang
*Attorney, Agent, or Firm*—Finnegan, Henderson, Farabow, Garrett & Dunner, L.L.P.

[57] ABSTRACT

The invention comprises a fast zoom lens system comprising, from an object side to an image side, three lens groups. The first lens group has an overall positive refractive power, the second lens group has an overall positive refractive power, and the third lens group has an overall negative refractive power. The first lens group, the second lens group and the third lens group move toward the object side during operation. In addition, a distance between the first lens group and the second lens group increases while a distance between the second lens group and the third lens group decreases when zooming from a wide-angle position to a telephoto position. Fast zoom lens systems consistent with the invention satisfy the following conditions:

$0.8 < f2/fw < 1.0$ $0.40 < D2/fw < 0.65$ where:
  f2 represents a focal length of the second lens group;
  fw represents a focal length of the fast zoom lens system at a wide-angle position; and
  D2 represents a distance between an entrance surface and an exit surface of the second lens group.

16 Claims, 24 Drawing Sheets

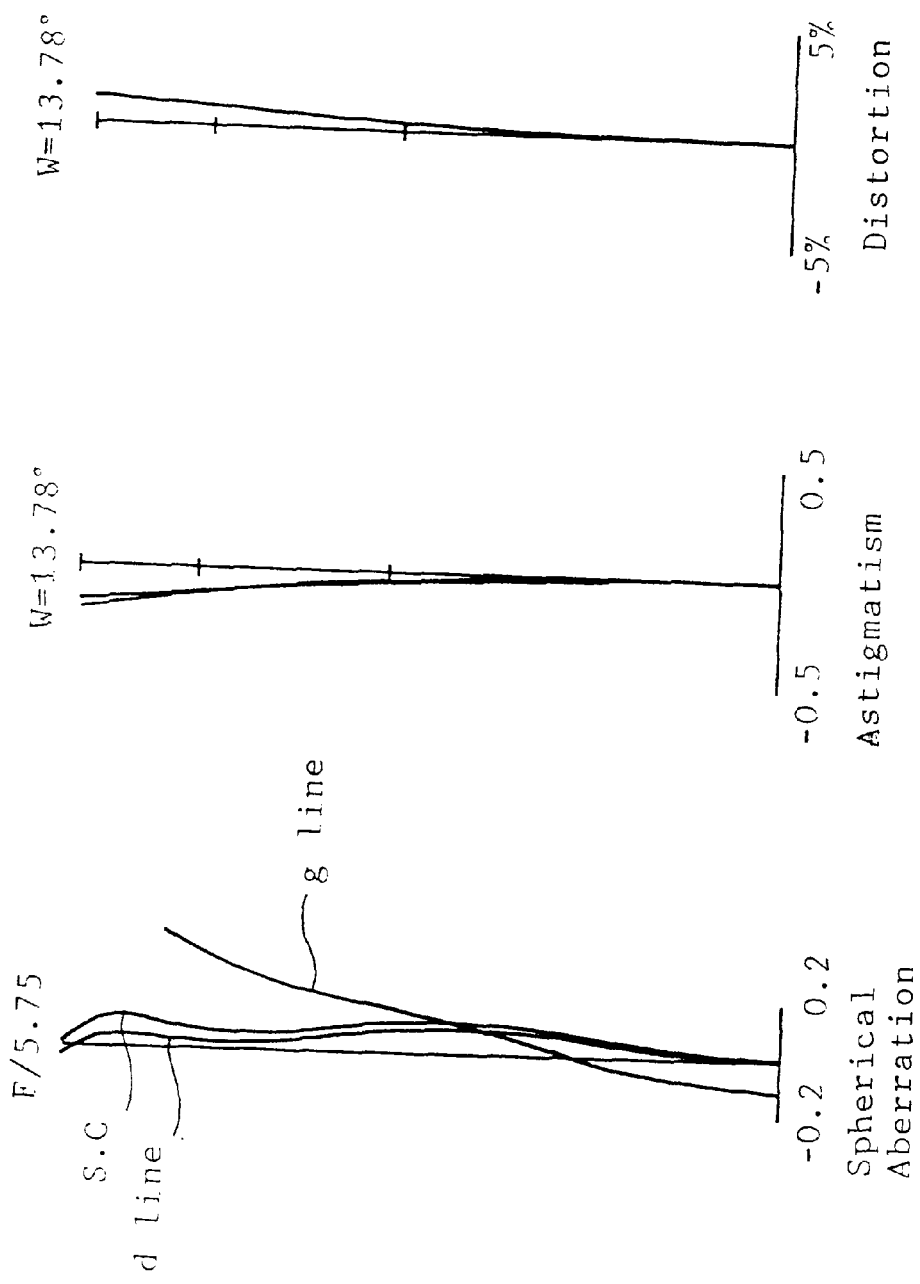

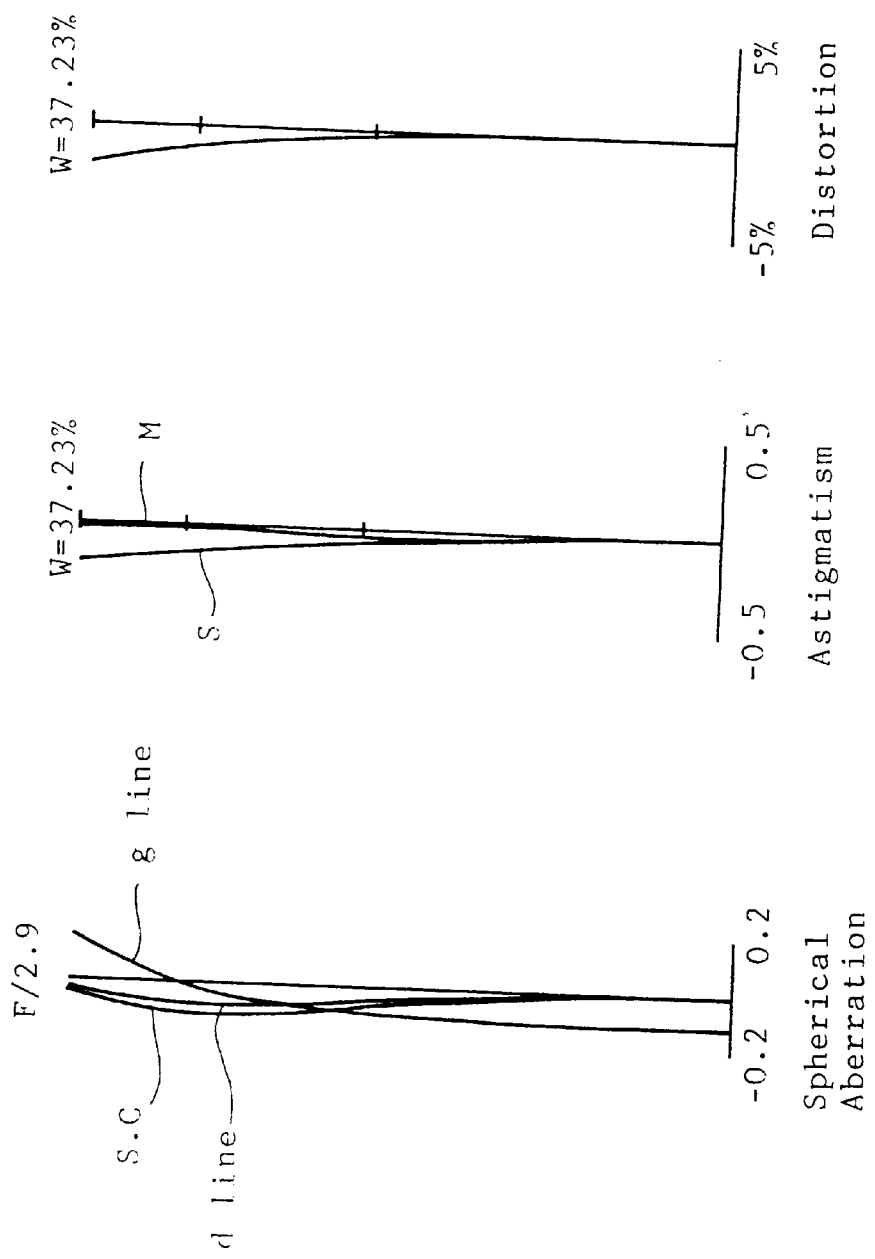

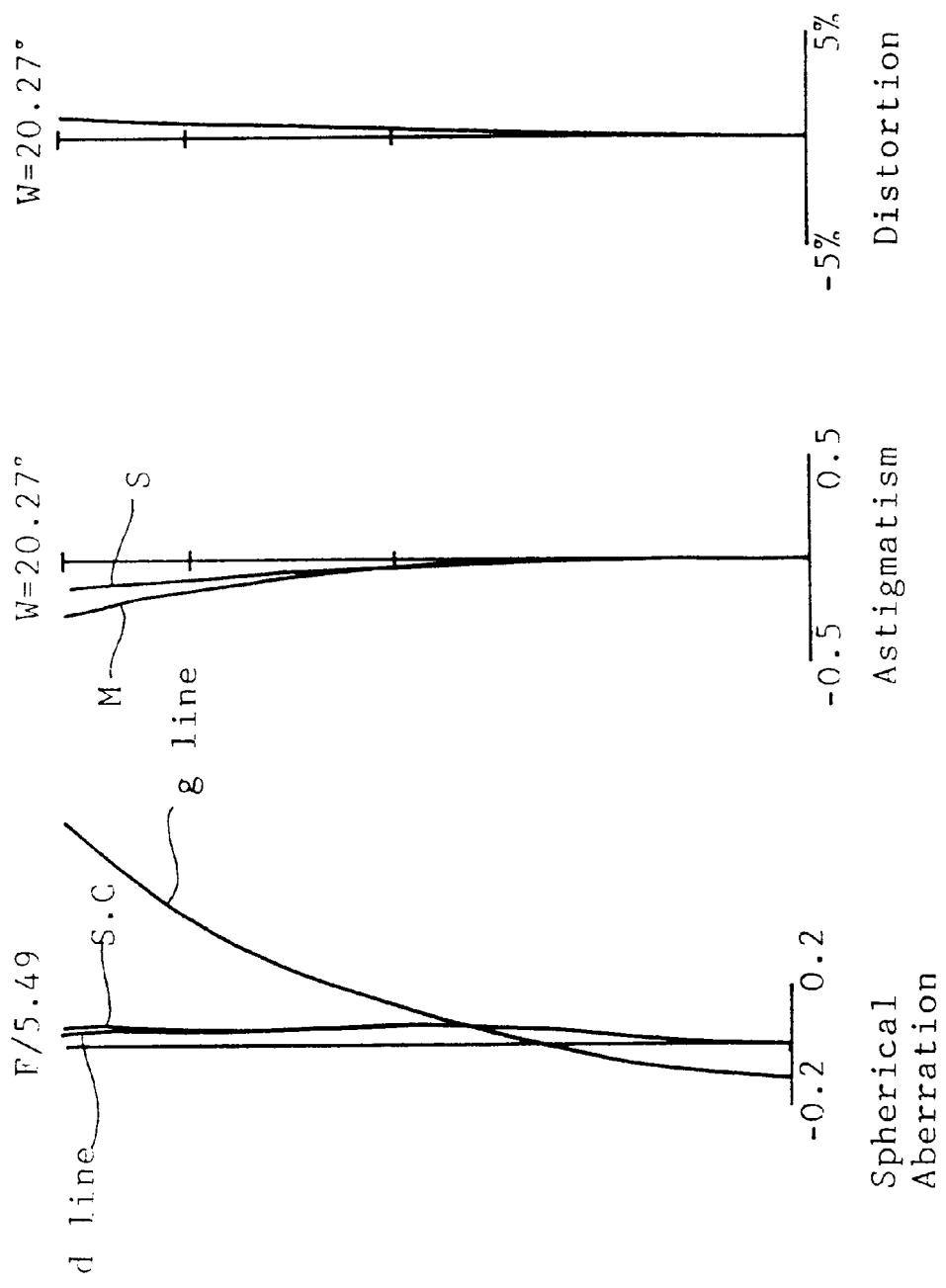

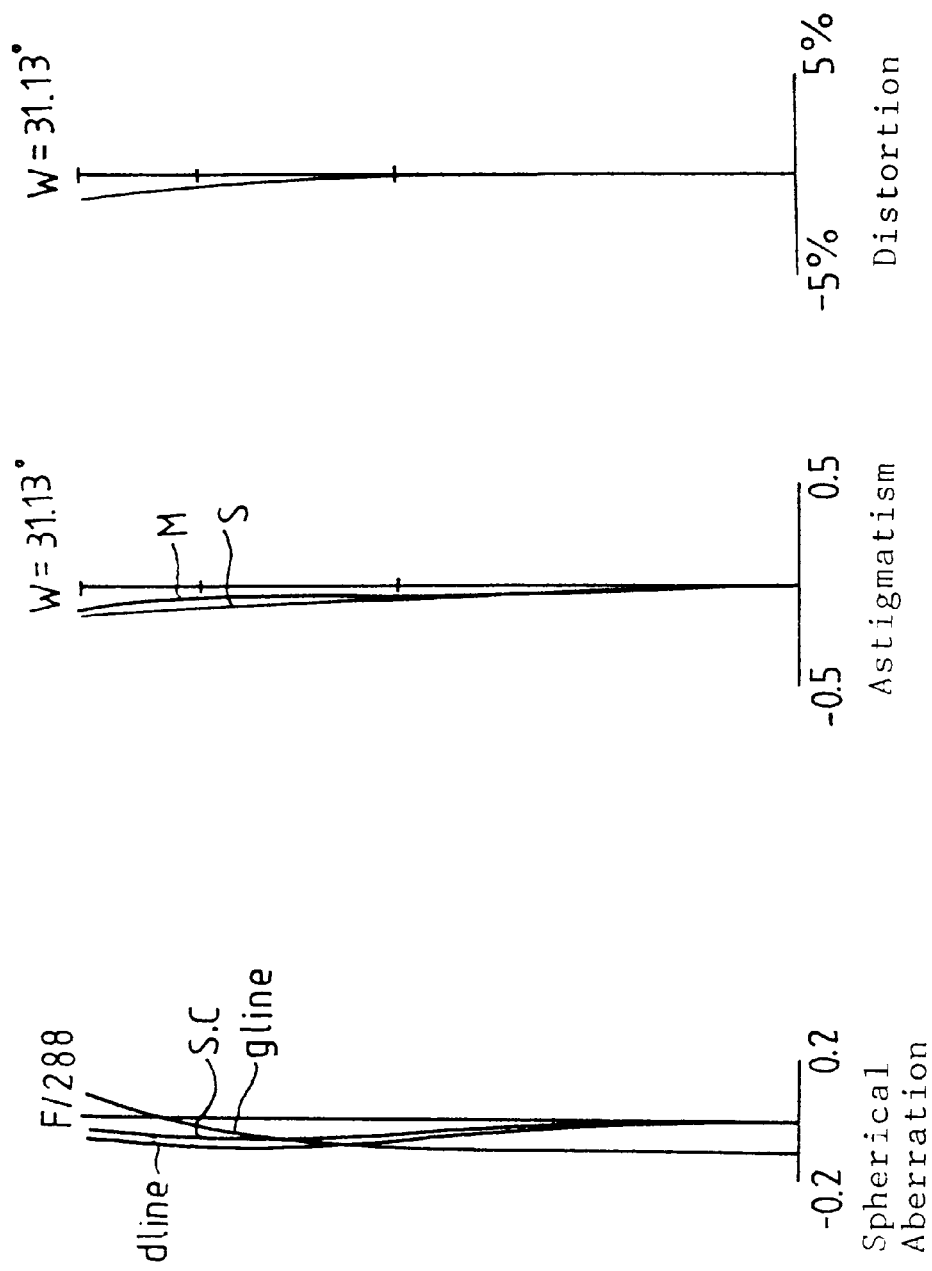

FIG. 6B
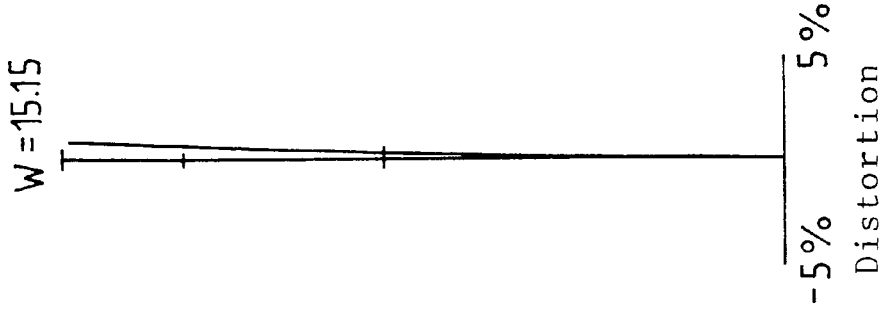
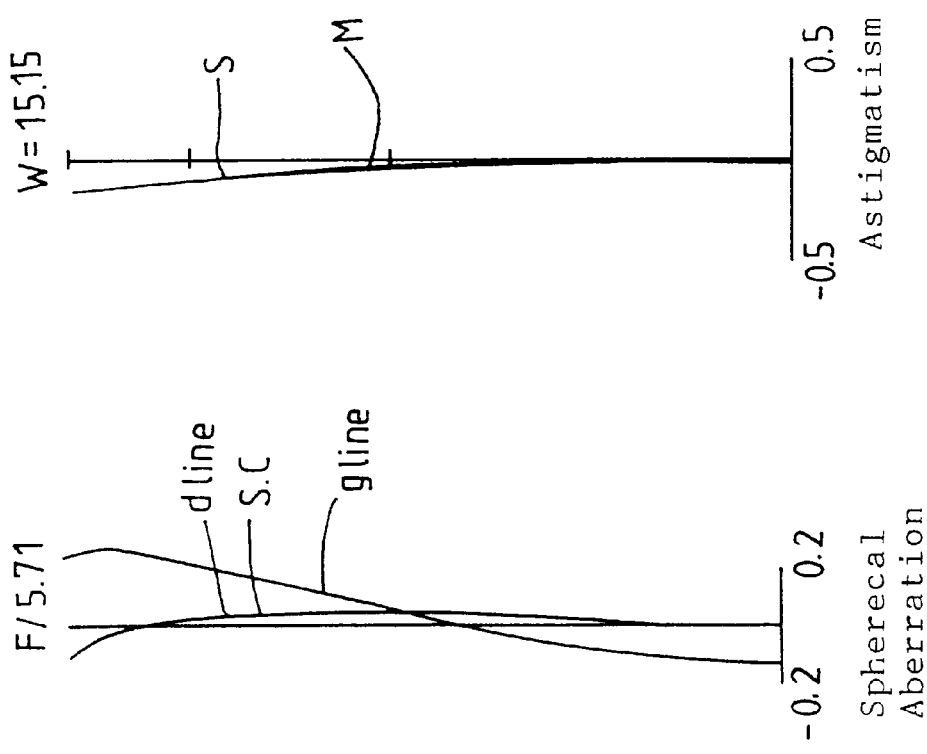

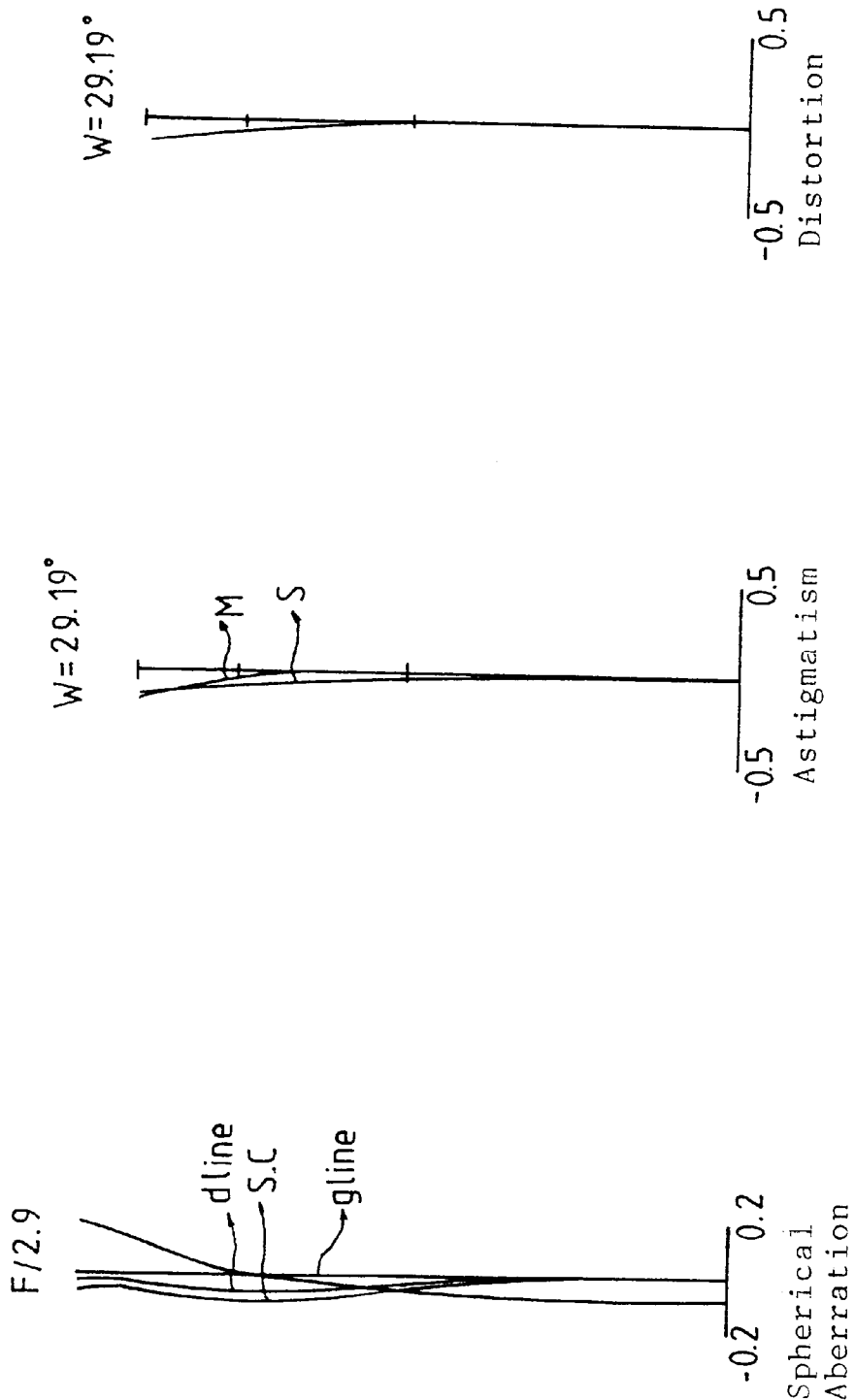

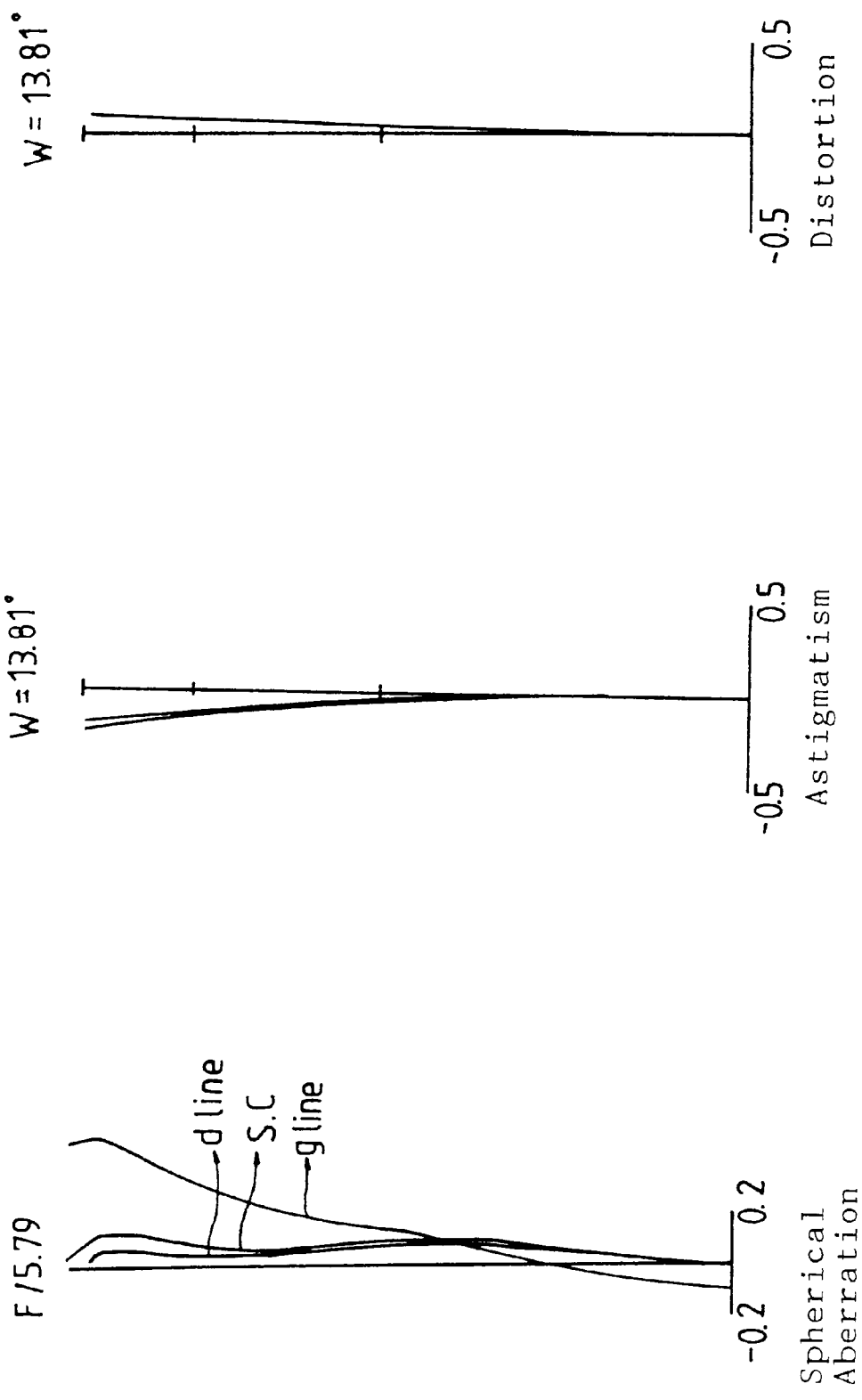

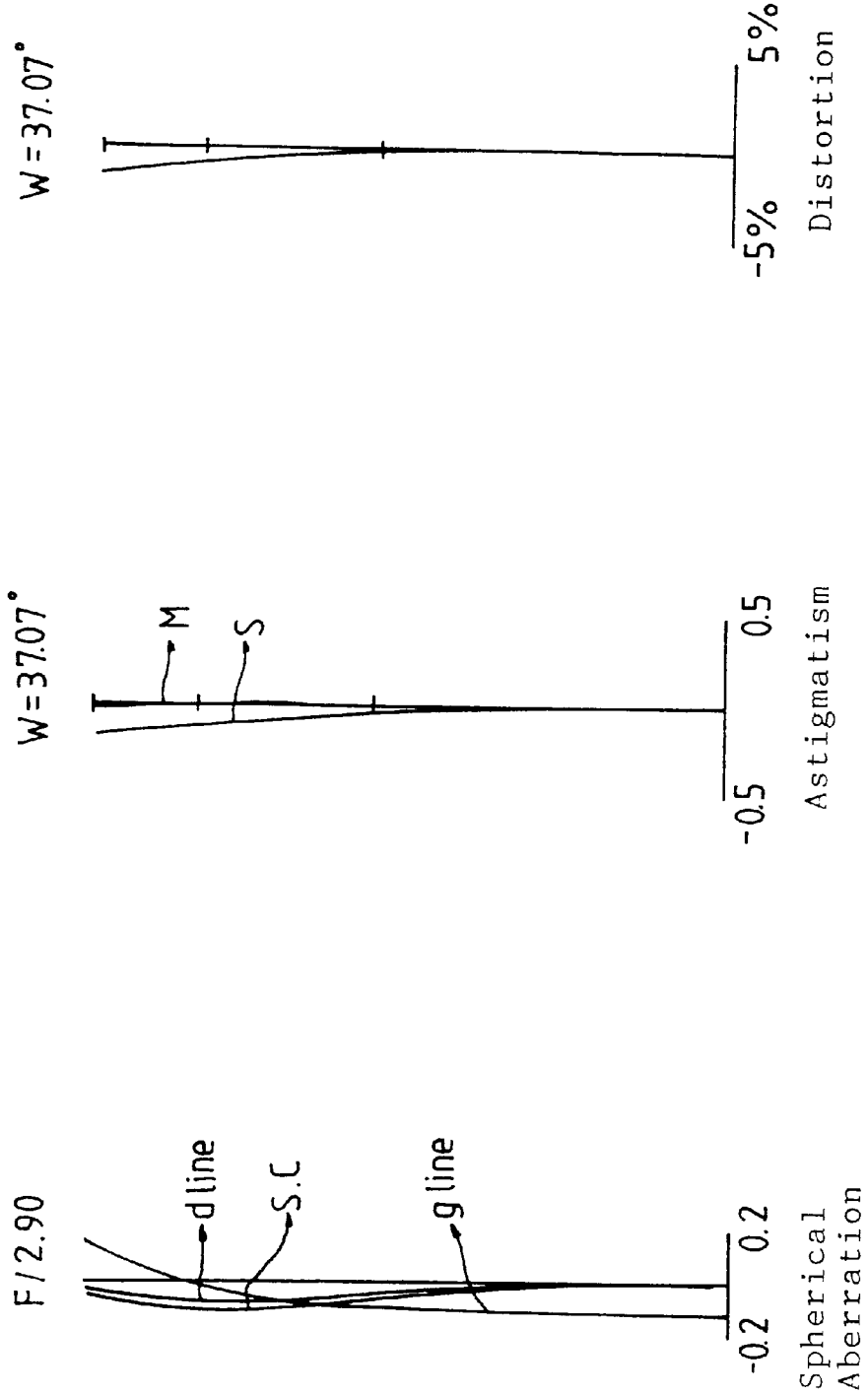

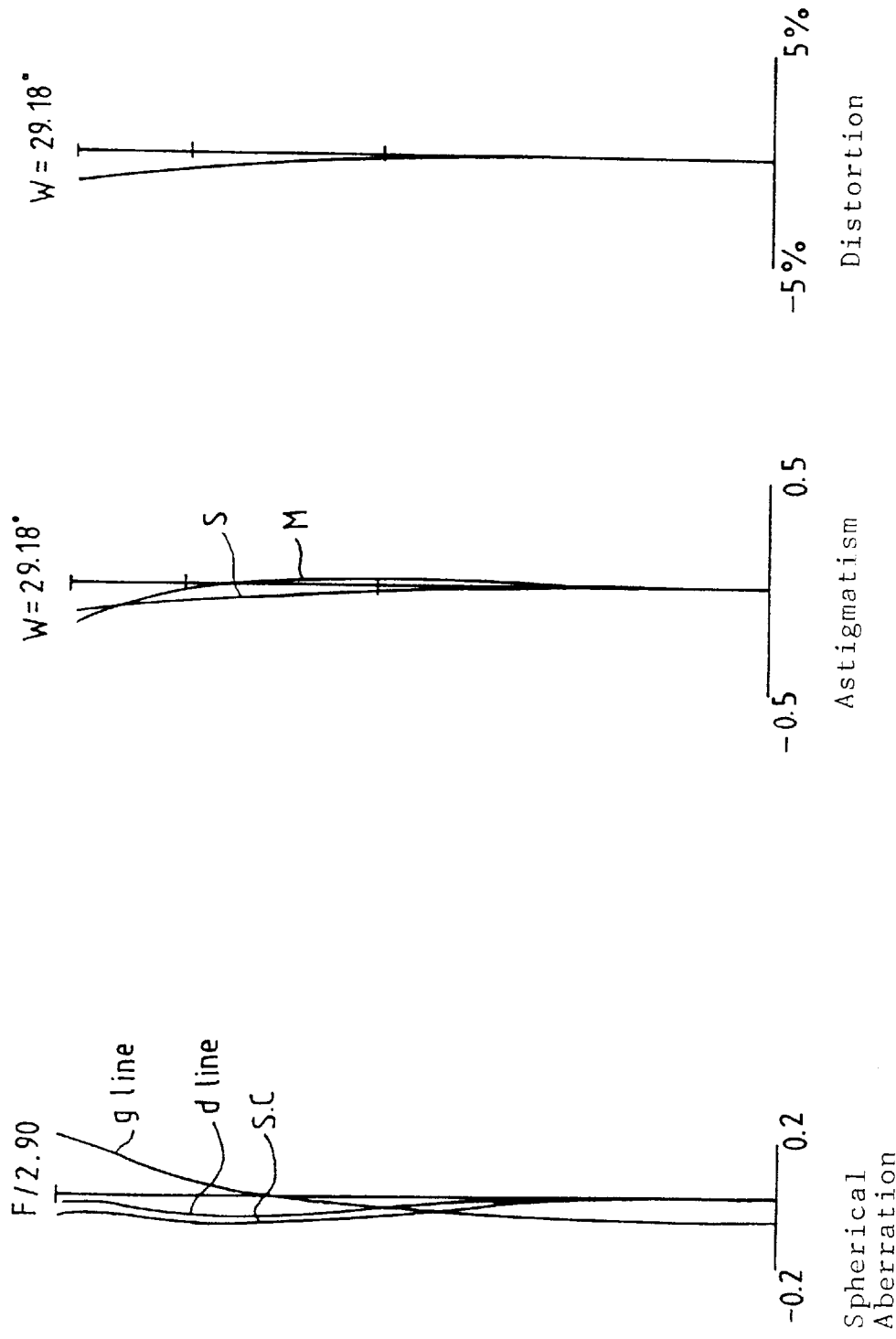

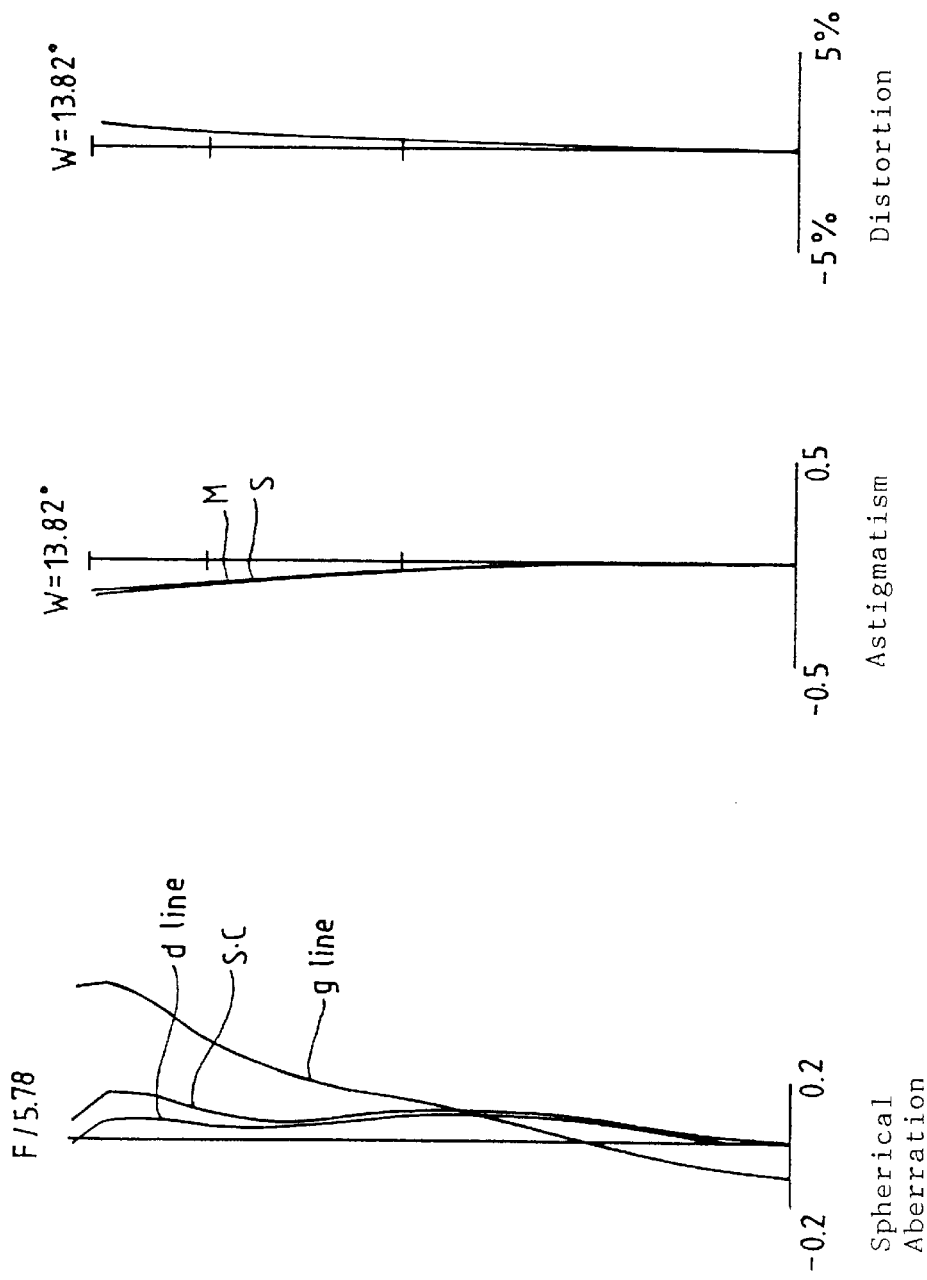

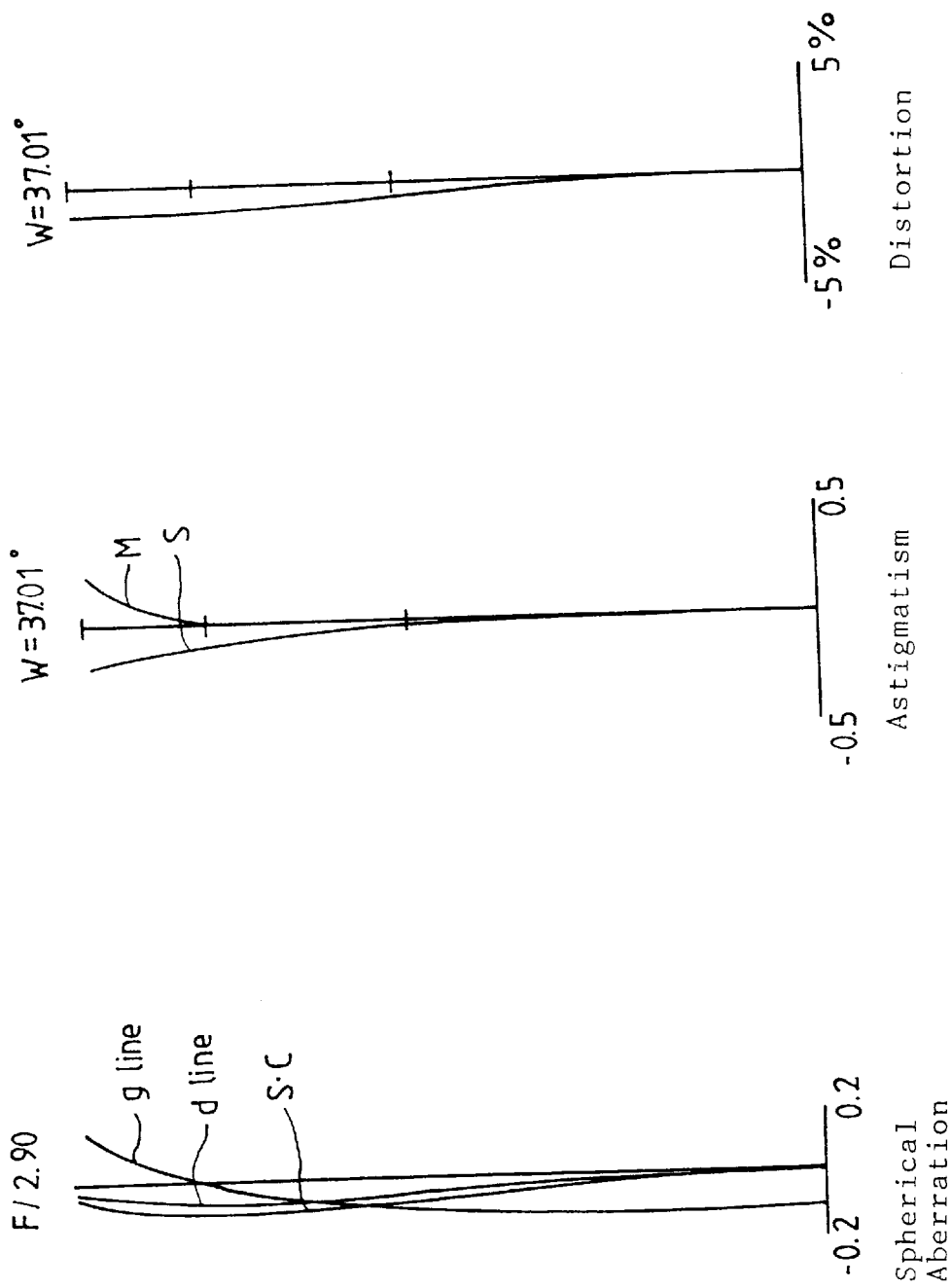

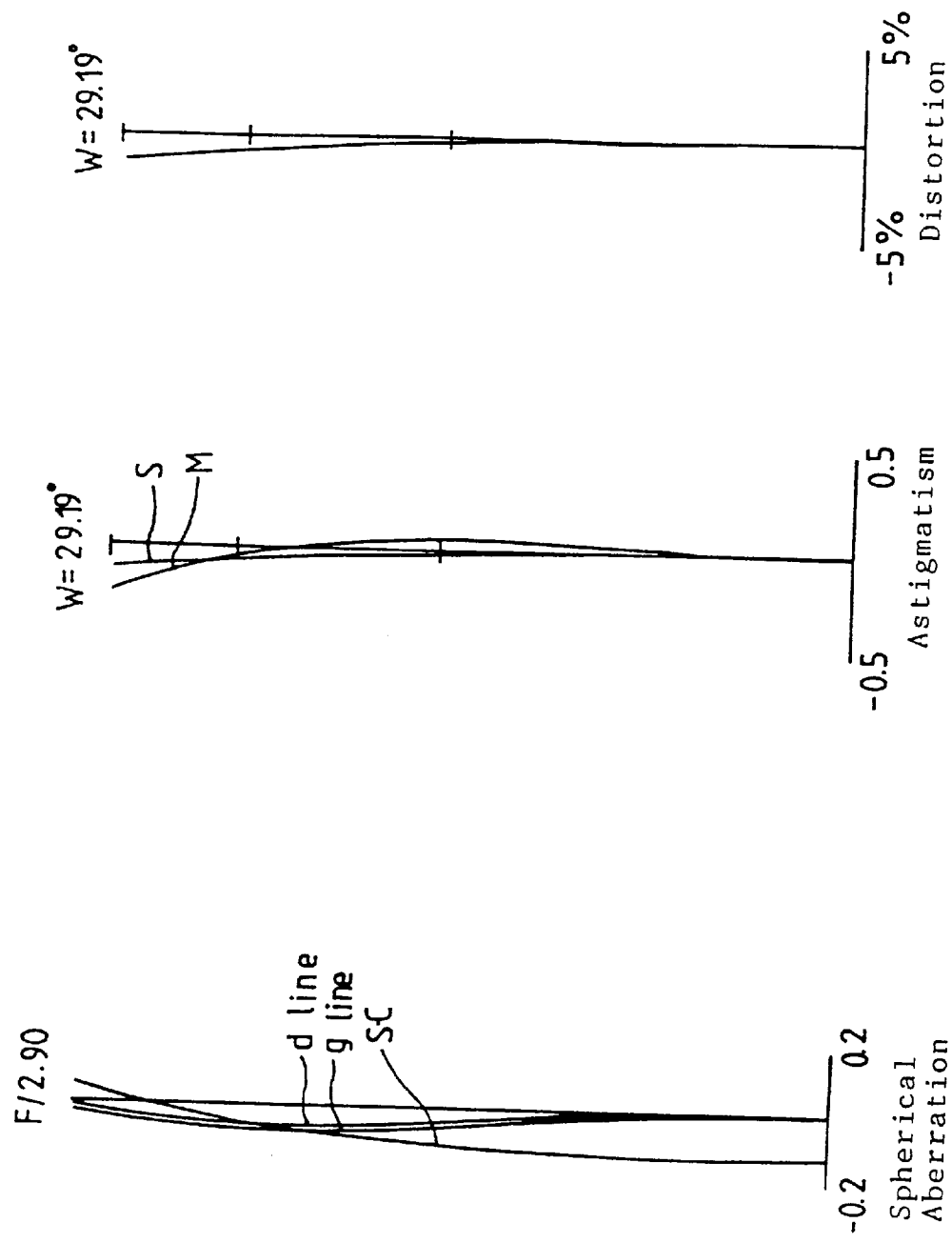

COMPACT CAMERA ZOOM LENS SYSTEM

BACKGROUND OF THE INVENTION

A. Field of the Invention

The present invention relates to a fast zoom lens system and, more particularly, to a compact fast zoom lens system comprising three lens groups.

B. Description of the Related Art

Automatic compact cameras have recently been provided with zoom lenses. One such compact camera, a leaf shutter camera, must also have a low price because it is typically used by non-professional photographers. Although normally these types of cameras are not used by professionals, this has been changing in recent years. Unfortunately, however, leaf shutter cameras do not meet the requirements of professional photographers since they presently provide fast lenses having a short focus and zoom lenses having an F number of more than 3.5.

Zoom lens systems having two lens groups have been proposed for leaf shutter cameras. One problem with these systems is that if the F number increases, a spherical aberration and coma will increase as well. As a result, the zoom lens system is usually used only when conditions require a zoom ratio of about 2.0 times and an F number of less than 3.5. Thus, the zoom lens systems suffer from the fact that an F number will decrease in proportion to a focal length at a telephoto position.

Zoom lens systems for leaf shutter cameras, having three lens groups, have been disclosed in Japanese Laid-Open Patent Publication Nos. Hei 2-201410 and Hei 2-37317. In these systems, the first lens group has a negative refractive power, the second lens group has a positive lens group, and the third lens group has a negative refractive power. These zoom lens systems can have a high zoom ratio and a high F number. However, they are not suitable for a compact camera since they are large in size.

Zoom lens systems for leaf shutter cameras, having three lens groups, have also been disclosed in U.S. Pat. No. 4,854,682, U.S. Pat. No. 4,978,204 and U.S. Pat. No. 5,148,321. In these systems, the first and second lens groups have a positive refractive power, while the third lens group has a negative refractive power. These zoom lens systems are compact and have a high zoom ratio, but the F number is more than 3.5. Thus, these zoom lens systems fail to meet professional standards as well.

SUMMARY OF THE INVENTION

Fast zoom lens systems consistent with the present invention have a zoom ratio of about 2.0 times and an F number of about 2.8. The fast zoom lens system is also compact and has a high level of performance.

To achieve these and other advantages, the invention comprises a fast zoom lens system comprising, from an object side to an image side, three lens groups. The first lens group has an overall positive refractive power, the second lens group has an overall positive refractive power, and the third lens group has an overall negative refractive power. The first lens group, the second lens group and the third lens group move toward the object side during operation. In addition, a distance between the first lens group and the second lens group increases while a distance between the second lens group and the third lens group decreases when zooming from a wide-angle position to a telephoto position. Fast zoom lens systems consistent with the invention satisfy the following conditions:

$$0.8 < f2/fw < 1.0$$

$$0.40 < D2/fw < 0.65$$

where:

$f2$ represents a focal length of the second lens group;

$fw$ represents a focal length of the fast zoom lens system at a wide-angle position; and $D2$ represents a distance between an entrance surface and an exit surface of the second lens group.

It is to be understood that both the foregoing general description and the following detailed description are exemplary and are intended to provide further explanation of the claimed invention.

BRIEF DESCRIPTION OF THE DRAWINGS

The above objects and features of the present invention will be apparent from the following description of the preferred embodiments with reference to the accompanying drawings. In the drawings:

FIGS. 2A and 2B show the aberration curves of a fast zoom lens system at a wide angle position and at a telephoto position, respectively, in accordance with a first preferred example of the invention;

FIGS. 4A and 4B show the aberration curves of a fast zoom lens system at a wide angle position and at a telephoto position, respectively, in accordance with a second preferred example of the invention;

FIGS. 6A and 6B show the aberration curves of a fast zoom lens system at a wide angle position and at a telephoto position, respectively, in accordance with a third preferred example of the invention;

FIGS. 8A and 8B show the aberration curves of a fast zoom lens system at a wide angle position and at a telephoto position, respectively, in accordance with a fourth preferred example of the invention;

FIGS. 10A and 10B show the aberration curves of a fast zoom lens system at a wide angle position and at a telephoto position, respectively, in accordance with a fifth preferred example of the invention;

FIGS. 12A and 12B show the aberration curves of a fast zoom lens system at a wide angle position and at a telephoto position, respectively, in accordance with a sixth preferred example of the invention;

FIGS. 14A and 14B show the aberration curves of a fast zoom lens system at a wide angle position and at a telephoto position, respectively, in accordance with a seventh preferred example of the invention;

FIGS. 16A and 16B show the aberration curves of a fast zoom lens system at a wide angle position and at a telephoto position, respectively, in accordance with a eighth preferred example of the invention.

DETAILED DESCRIPTION

Fast zoom lens system consistent with the present invention will now be described in detail with reference to the accompanying drawings.

As shown in FIGS. 1, 3, 5, 7, 9 or 11, preferred examples according to the present invention provide a fast zoom lens system. The zoom lens system comprises a first lens group I, a second lens group II, and a third lens group III. An aperture stop 20 is installed between the first lens group I and the second lens group II.

Figure 1A:
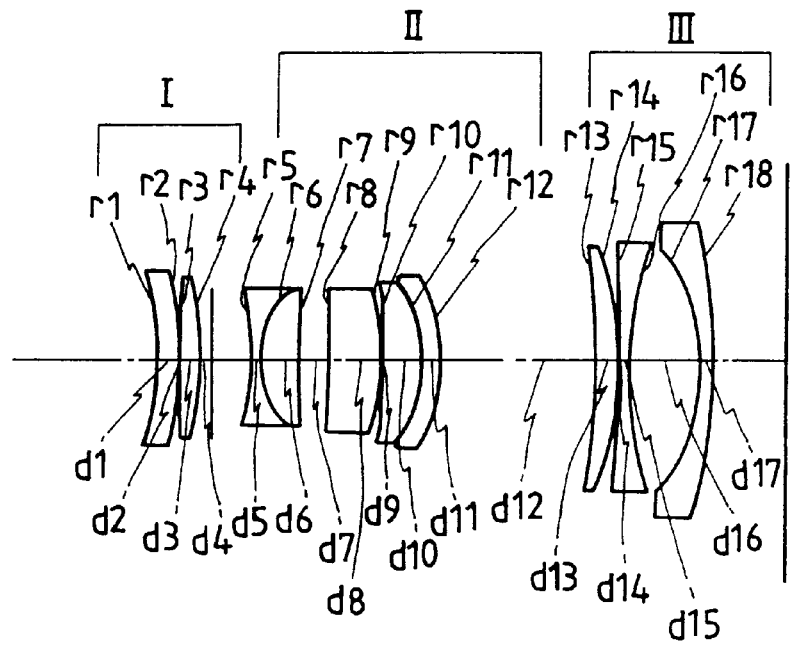
FIGS. 1A and 1B are schematic sectional views of a fast zoom lens system at a wide-angle position and at a telephoto position, respectively, in accordance with a first example of the present invention.
Figure 1B:
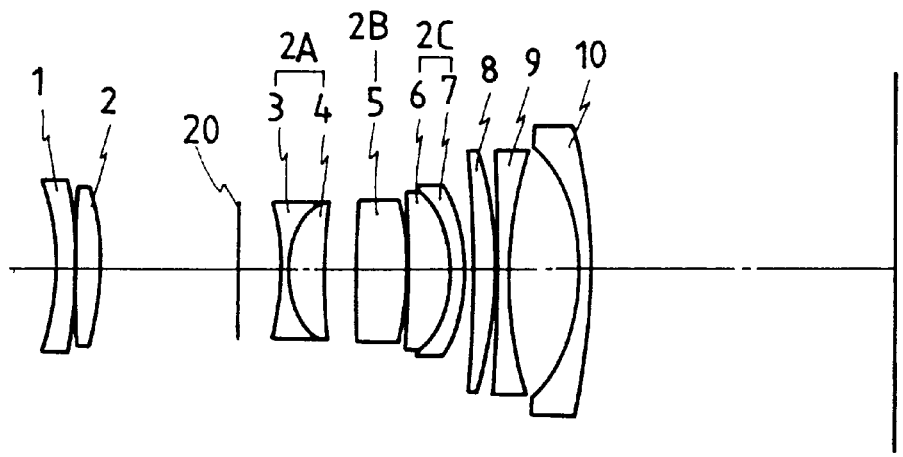
Figure 3A:
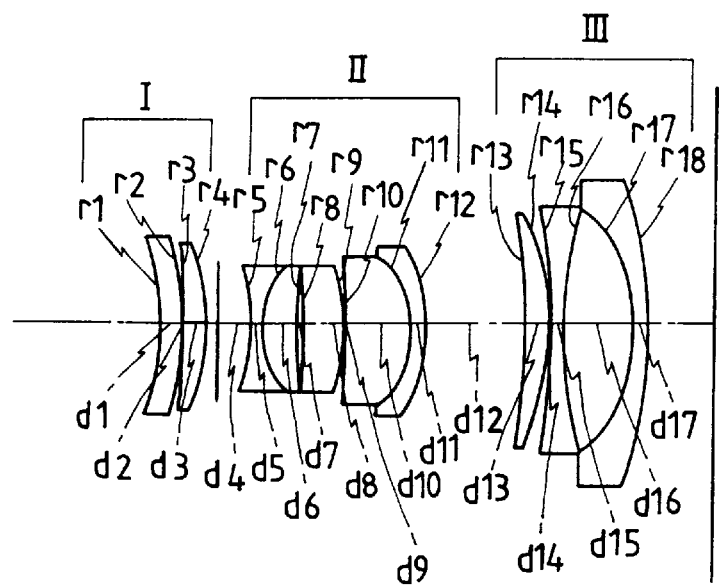
FIGS. 3A and 3B are schematic sectional views of a fast zoom lens system at a wide-angle position and at a telephoto position, respectively, in accordance with a second example of the present invention.
Figure 3B:
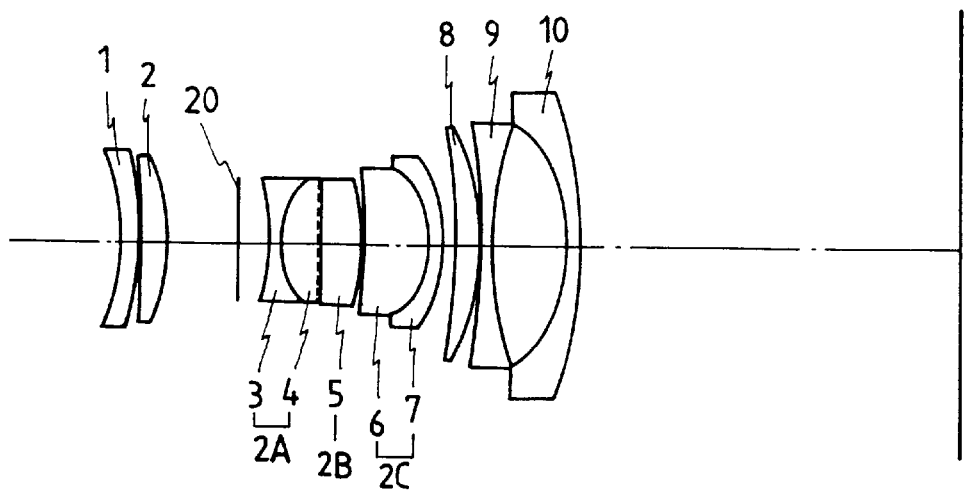
Figure 5A:
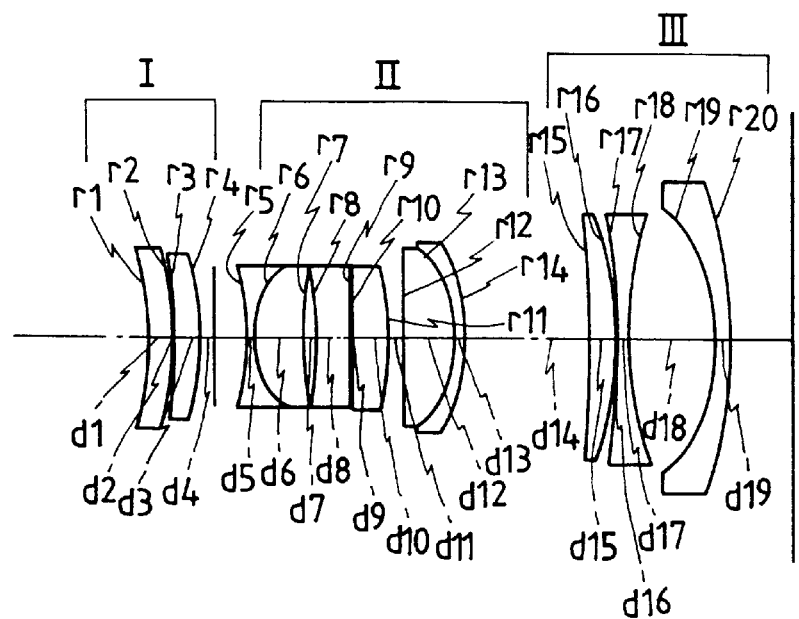
FIGS. 5A and 5B are schematic sectional views of a fast zoom lens system at a wide-angle position and at a telephoto position, respectively, in accordance with a third example of the present invention.
Figure 5B:
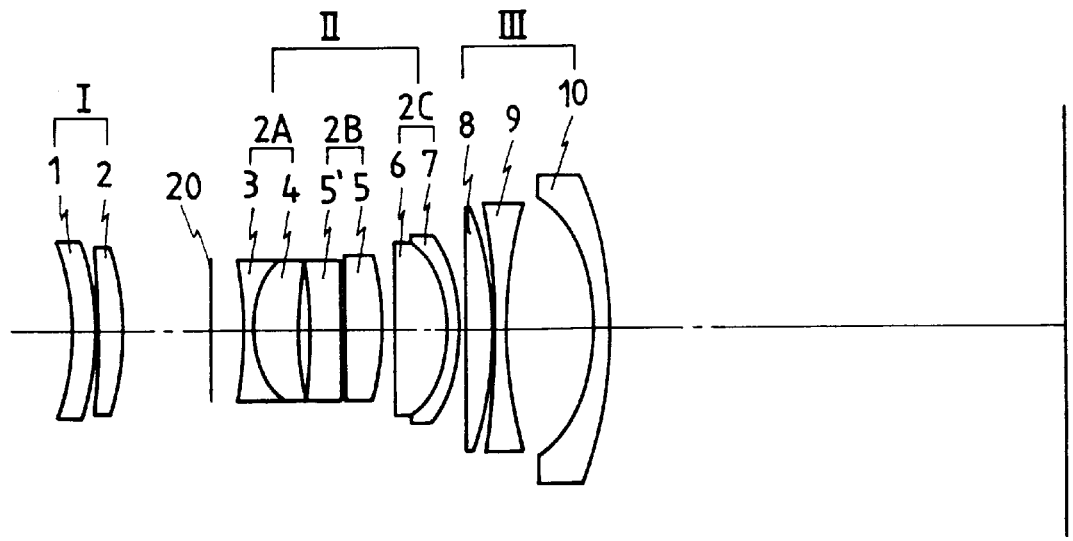
Figure 7A:
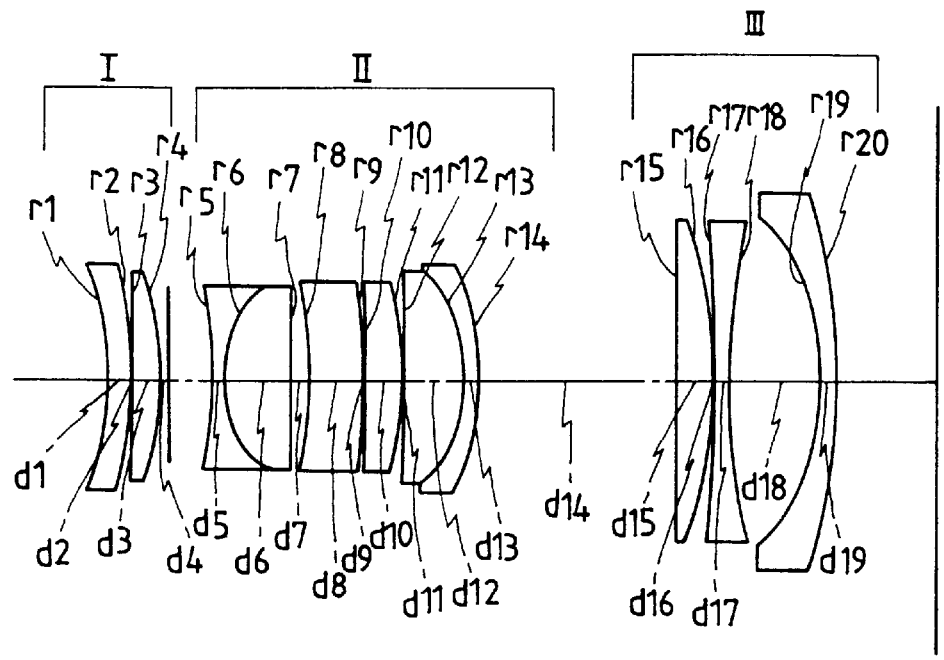
FIGS. 7A and 7B are schematic sectional views of a fast zoom lens system at a wide-angle position and at a telephoto position, respectively, in accordance with a fourth example of the present invention.
Figure 7B:
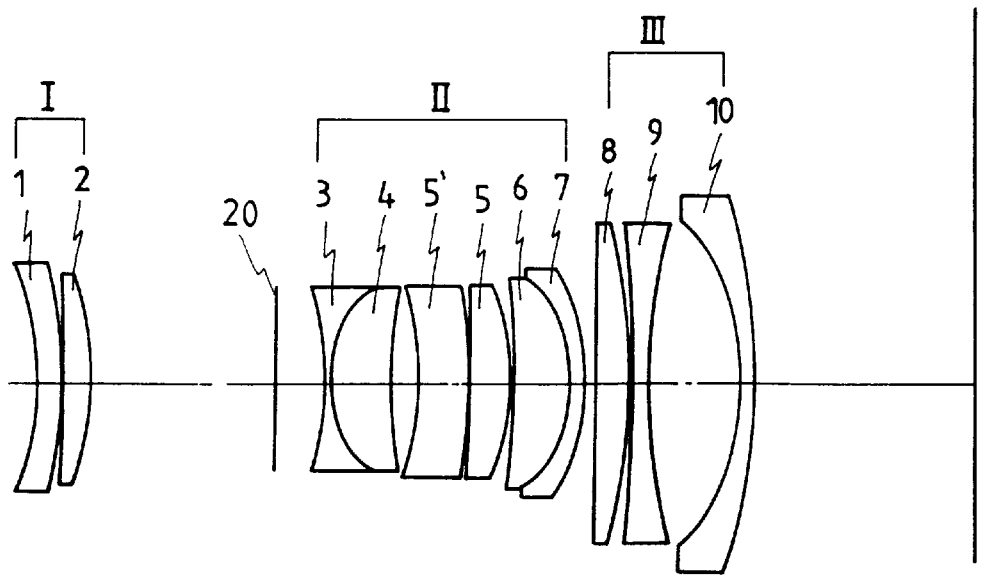
Figure 9A:
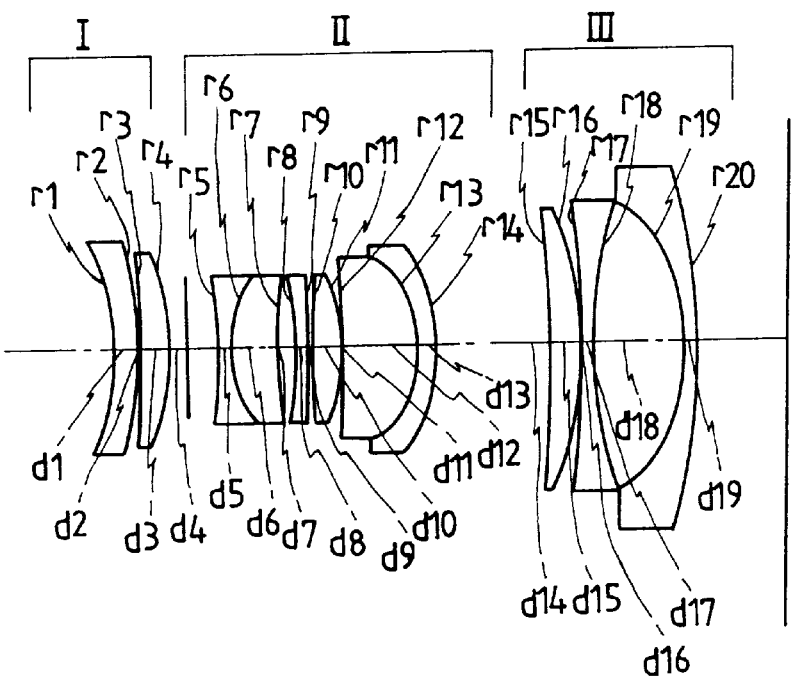
FIGS. 9A and 9B are schematic sectional views of a fast zoom lens system at a wide-angle position and at a telephoto position, respectively, in accordance with a fifth example of the present invention.
Figure 9B:
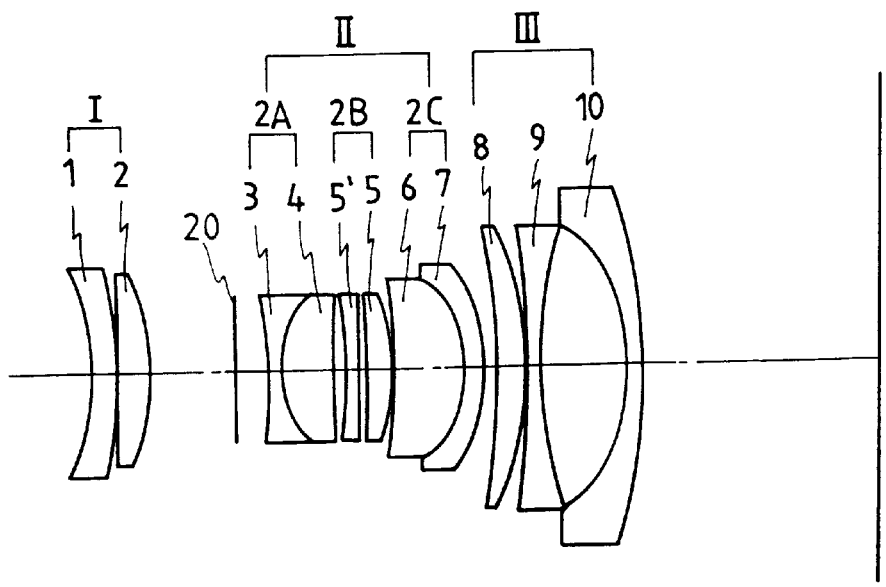

As shown in FIGS. 1 and 3, the first lens group I, having an overall positive refractive power, includes two lens units. A first lens unit 1 has a positive refractive power and a second lens unit 2 has a positive refractive power. The second lens group II, having an overall positive refractive power, includes three sub-group lens units 2A, 2B and 2C. First sub-group lens unit 2A further includes a third lens unit 3 having a negative refractive power and a fourth lens unit 4 having a positive refractive power. Second sub-group lens unit 2B further includes a fifth lens unit 5 having a positive refractive power. Third sub-group lens unit 2C further includes a sixth lens unit 6 having a positive refractive power and a seventh lens unit 7 having a negative refractive power. The third lens group III, having an overall negative refractive power, includes three lens units. An eighth lens unit 8 having a positive refractive power, a ninth lens unit 9 having a negative refractive power, and a tenth lens unit 10 having a negative refractive power.

As shown in FIGS. 5, 7, 9, 11 and 15, second sub-group lens unit 2B may be modified to include two lens units. One of these is fifth lens unit 5, while the other is a lens unit 5' having a negative refractive power and located on the object side of fifth lens unit 5.

When zooming from a wide-angle position to a telephoto position, the first lens group I, the second lens group II and the third lens group III each move toward an object side (i.e. the left side of the Figures). In addition, the distance between the first lens group I and the second lens group II increases and the distance between the second lens group II and the third lens group III decreases. During zooming, aperture stop 20 and the second lens group II will move together. While focusing, however, only the second lens group II moves and aperture stop 20 remains fixed. Fast zoom lens systems consistent with a first embodiment of the present invention satisfy the following conditions:

$$0.8 < f2/fw < 1.0 \tag{1}$$

$$0.40 < D2/fw < 0.65 \tag{2}$$

$$1.4 < Lw/fw < 2.0 \tag{3}$$

$$2.3 < f1/fw < 3.8 \tag{4}$$

$$0.7 < |f3|/fw < 1.0 \tag{5}$$

$$2.9 < f1 \times \{[1/(N1p \times V1p)] + [1/(N1n \times V1n)]\} < 4.5 \tag{6}$$

$$-0.2 < N2p - N2n < 0.0 \tag{7}$$

$$15.0 < V2p - V2n < 25.0 \tag{8}$$

$$0.0 < N3p - N3n < 0.2 \tag{9}$$

$$-35.0 < V3p - V3n < -20 \tag{10}$$

where:

f2 represents a focal length of the second lens group II;

fw represents a focal length of the zoom lens system at a wide-angle position;

D2 represents a distance between an entrance surface and an exit surface of the second lens group II;

Lw represents a distance between an entrance surface of the first lens group I and a film plane at a wide-angle position;

f1 represents a focal length of the first lens group I;

f3 represents a focal length of the third lens group III;

N1p represents an average refractive index of lens units of the first lens group I having a positive refractive power;

N1n represents an average refractive index of lens units of the first lens group I having a negative refractive power;

V1p represents an average Abbe number of lens units of the first lens group I having a positive refractive power;

V1n represents an average Abbe number of lens units of the first lens group I having a negative refractive power;

N2p represents an average refractive index of lens units of the second lens group II having a positive refractive power;

N2n represents an average refractive index of lens units of the second lens group II having a negative refractive power;

V2p represents an average Abbe number of lens units of the second lens group II having a positive refractive power;

V2n represents an average Abbe number of lens units of the second lens group II having a negative refractive power;

N3p represents an average refractive index of lens units of the third lens group III having a positive refractive power;

N3n represents an average refractive index of lens units of the third lens group III having a negative refractive power;

V3p represents an average Abbe number of lens units of the third lens group III having a positive refractive power; and V3n represents an average Abbe number of lens units of the third lens group III having a negative refractive power.

Condition (1) relates to a refractive power of the second lens group II. If the lower limit of condition (1) is violated, the refractive power of the second lens group II increases. This makes it difficult to compensate for aberrations and a change in aberration will thus increase. If the upper limit of condition (1) is violated, the refractive power of the second lens group II will decrease. This will increase the amount of shift of each lens group during zooming.

Condition (2) relates to a length of the second lens group II. If the lower limit of condition (2) is violated, the length of the second lens group II becomes short. This causes the refractive power of the second lens group II to increase, making it difficult to compensate for aberrations. In addition, it becomes difficult to design the lens as having the required thickness and edge thickness. If the upper limit of condition (2) is violated, it is difficult to obtain a marginal illumination.

Conditions (3) and (4) relate to the lens material. If the lower limit of condition (3) is violated, it is possible to design a compact a zoom lens system. However, the refractive power of each lens group increases, making it difficult to compensate for aberrations. Further, a change in aberration will increase when zooming. If the upper limit of condition (3) is violated, it will be impossible to create a zoom lens system having a compact size. If the lower limit of condition (4) is violated, it will be easy to decrease the total length of zoom lens system at a wide-angle position. However, as the back focal length of the zoom lens system becomes short, the following factors will increase: the lens diameter of the lens in third lens group III closest to an image side, Petzval's sum, and a chromatic aberration. If the upper limit of condition (4) is violated, it will be easy to compensate for aberrations. However, it will be difficult to reduce the length of the zoom lens system.

Conditions (5) and (6) relate to the construction of the lenses. If the lower limit of condition (5) is violated, it will be easy to compensate for aberrations. However, the refractive power of the third lens group III will increase, making it difficult to compensate for a change in aberration, particularly the curvature of field. If the upper limit of condition (5) is violated, the refractive power of the third lens group III decreases. This causes the total length of the zoom lens system to become large. If the lower limit of condition (6) is violated, the refractive power of the first lens group I increases, making it difficult to compensate for aberrations. If the upper limit of condition (6) is violated, a chromatic aberration increases.

Conditions (7) and (8) relate to a material of the second lens group II. If the lower limits of conditions (7) and (8) are violated, it will be difficult to compensate for a spherical aberration and a longitudinal chromatic aberration. If the upper limits of conditions (7) and (8) are violated, it will be difficult to compensate for a curvature of field.

Conditions (9) and (10) relate to a material of the third lens group III. If the lower limits of conditions (9) and (10) are violated, it will be difficult to compensate for a chromatic aberration which varies according to a magnification. If the upper limits of conditions (9) and (10) are violated, it is difficult to compensate for a coma aberration.

A fast zoom lens system consistent with a second embodiment of the present invention will now be described. The construction of a fast zoom lens system according to the second embodiment of the present invention is the same as that described above with respect to the first embodiment. Fast zoom lens system consistent with the second embodiment of the present invention, however, satisfy the following conditions:

$$0.70 < f2/fw < 1.10 \quad (11)$$

$$0.35 < D2/fw < 0.70 \quad (12)$$

$$1.3 < Lw/fw < 2.1 \quad (13)$$

$$2.0 < f1/fw < 3.8 \quad (14)$$

$$0.6 < |f3|/fw < 1.0 \quad (15)$$

$$2.85 < f1 \times \{[1/(N1p \times V1p)] + [1/(N1n \times V1n)]\} < 4.55 \quad (16)$$

$$-0.2 < N2p - N2n < 0.0 \quad (17)$$

$$15.0 < V2p - V2n < 25.0 \quad (18)$$

$$0.0 < N3p - N3n < 0.2 \quad (19)$$

$$-35.0 < V3p - V3n < -20 \quad (20)$$

$$r1 < 0 \quad (21)$$

$$0.5 < |f11/f1| < 1.0 \quad (22)$$

where:

r1 represents a radius of curvature of the first lens unit of the zoom lens system;

f 11 represents a focal length of the first lens unit of the first lens group I; and f1 represents a focal length of the first lens group I.

Conditions (11) to (20) are the same as conditions (1) to (10), with the exception that their upper and/or lower limits have been changed in accordance with the values used in the second embodiment. Accordingly, these conditions will not be described further.

Conditions (21) and (22) relate to zooming and focusing operations. During focusing, only lenses will move. During zooming, on the other hand, the lenses and the aperture will as a single unit. In this way, the weight of the zoom lens system that is moved is light. If condition (21) is satisfied, it will be possible to obtain a good back focal length of the zoom lens system at a wide-angle position. If the lower limit of condition (22) is violated, the refractive power of the first lens group I will increase. This will make it easy to obtain a good back focal length, but will make it difficult to compensate for aberrations. If the upper limit of condition (22) is violated, it will be difficult to decrease the total length of the zoom lens system.

In fast zoom lens systems consistent with the present invention, the first lens group I comprises a first lens unit 1 having a negative refractive power and a second lens unit 2 having a positive refractive power, as described above. This will make it possible to obtain a good back focal length while maintaining a high level of performance. In addition, the second lens group II includes an aspherical lens and at least one cemented lens unit. The cemented lens unit comprises the following two lens units cemented together: a lens unit having a positive refractive power and a lens unit having a negative refractive power. The cemented lens unit having a positive refractive power includes at least one aspherical surface. This makes it possible to simultaneously compensate for chromatic aberrations, spherical aberration and a coma aberration.

A coefficient of an aspherical lens of a fast zoom lens system consistent with the present invention, and which satisfies any of the above conditions (1) to (22), is expressed by the following equations:

$$Z = cS^2/\{1 + (1-(K+1)c^2S^2)^{1/2}\} + A_4S^4 + A_6S^6 + A_8S^8 + A_{10}S^{10}$$

$$c = 1/R$$

$$S^2 = x^2 + Y^2$$

where:

Z represents a distance from the lens vertex to an optical axis;

c represents a reciprocal of the radius of curvature;

S represents a radial distance from the optical axis;

K represents the conic constant; and $A_4, A_6, A_8, A_{10}$ represent aspherical coefficients.

Values which satisfy the above conditions (1) to (22), according to the preferred embodiments of the invention, are described in the Tables below. In each of these Tables, all units of length are denominated in millimeters and the following variables are used:

$r_i$ (i=1 to 18) represents a radius of curvature of a refractive surface;

$d_i$ (I=1 to 18) represents the thickness of a lens or the distance between lens surfaces;

nd represents the d-line refractive index of a lens unit;

v represents the Abbe number of a lens unit; and

ω represents the half viewing angle.

Values for a first example consistent with the present invention (see FIG. 1) are shown in Table 1, where: the focal length f ranges from 39.105 mm to 86.988 mm; the half viewing angle ω ranges from 29.12° to 13.78°; the back focal length fb ranges from 7.497 mm to 52.069 mm; and the iris value F of a large aperture zoom lens system ranges from 2.90 to 5.75.

TABLE 1

| Surface Number | radius of curvature $r_i$ | distance $d_i$ | refractive power nd | Abbe number v |
|---|---|---|---|---|
| 1 | −29.337 | 2.00 | 1.84666 | 23.78 |
| 2 | −44.822 | 0.10 | | |
| 3 | 955.200 | 2.24 | 1.56907 | 71.30 |
| 4 | −35.205 | Z1 | | |
| 5 | −26.633 | 0.80 | 1.63854 | 55.45 |
| 6 | 10.233 | 3.83 | 1.81474 | 37.03 |
| *7 | 84.706 | 3.01 | | |
| 8 | 168.981 | 5.50 | 1.64000 | 60.15 |
| 9 | −30.203 | 0.12 | | |
| 10 | −93.125 | 4.64 | 1.56907 | 71.30 |
| 11 | −11.685 | 1.21 | 1.84666 | 23.78 |
| 12 | −19.154 | Z2 | | |
| 13 | −116.015 | 2.21 | 1.84666 | 23.78 |
| 14 | −40.535 | 0.12 | | |
| 15 | −304.332 | 1.20 | 1.63854 | 55.45 |
| 16 | 42.413 | 7.59 | | |
| 17 | −20.070 | 1.20 | 1.77250 | 49.62 |
| 18 | −58.834 | | | | where * represents an aspherical surface, Z1 ranges from 5.3021 mm to 18.8355 mm, and Z2 ranges from 15.6321 mm to 1.0000 mm during zooming.

According to the first example consistent with the present invention, the coefficients of the aspherical seventh lens surface is described by the above formula using the aspherical coefficients shown in Table 2.

TABLE 2

| | aspherical coefficients of the seventh surface |
|---|---|
| K | −0.3839082604249E + 2 |
| A4 | 0.5442612270423E − 4 |
| A6 | 0.3026266984029E − 7 |
| A8 | 0.1592650344029E − 8 |
| A10 | −0.3490673624234E − 11 |

Figure 2A:
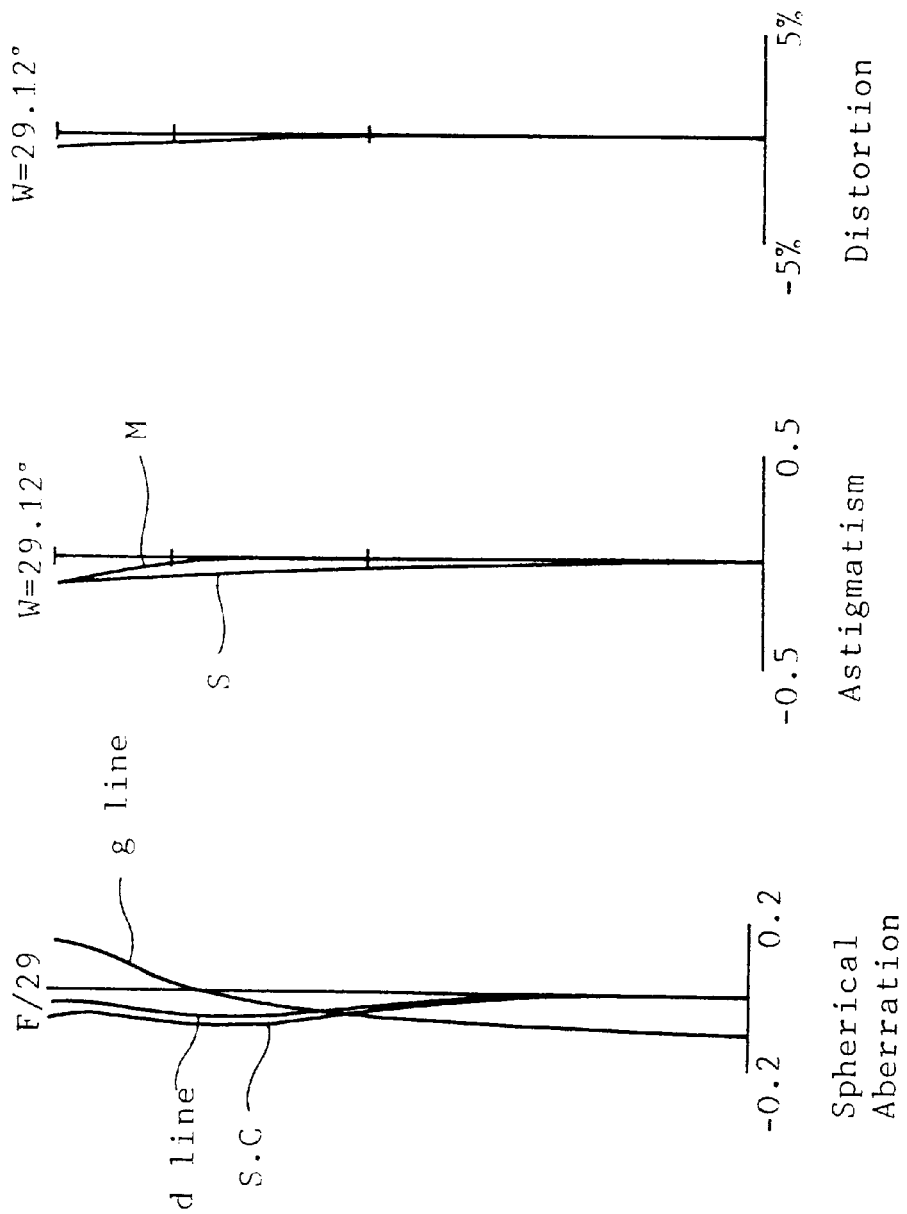

FIGS. 2A and 2B illustrate the superior aberration characteristics of the first preferred example, at a wide-angle position and at a telephoto position, respectively. In FIG. 2, as well as in FIGS. 4, 6, 8, 10 and 12, the following variables are used: S.C. which represents the sine condition; d-line which represents the spherical aberration; g-line which represents the longitudinal chromatic aberration; S which represents astigmatism in the sagittal direction; and M which represents astigmatism in the tangential direction.

Values for a second example consistent with the present invention (see FIG. 3) are shown in Table 3, where: the focal length f ranges from 29.000 mm to 58.997 mm; the half viewing angle ω ranges from 37.23° to 20.27°; the back focal length fb ranges from 5.997 mm to 33.736 mm; and the F number ranges from 2.90 to 5.49.

TABLE 3

| Surface Number | radius of curvature $r_i$ | distance $d_i$ | refractive power nd | Abbe number v |
|---|---|---|---|---|
| 1 | −18.393 | 1.56 | 1.84666 | 23.78 |
| 2 | −29.446 | 0.10 | | |
| 3 | −145.958 | 2.20 | 1.56907 | 71.30 |
| 4 | −20.154 | Z1 | | |
| 5 | −17.432 | 0.80 | 1.62041 | 60.34 |
| 6 | 8.268 | 3.25 | 1.81474 | 37.03 |
| *7 | 200.000 | 0.19 | | |
| 8 | 1999.800 | 3.85 | 1.49700 | 81.61 |
| 9 | −20.176 | 0.12 | | |
| 10 | −135.644 | 6.00 | 1.59240 | 68.30 |
| 11 | −8.175 | 1.20 | 1.84666 | 23.78 |
| 12 | −13.540 | Z2 | | |
| 13 | −54.766 | 1.99 | 1.84666 | 23.78 |
| 14 | −26.246 | 0.12 | | |
| 15 | −75.802 | 1.20 | 1.62299 | 58.12 |
| 16 | 35.567 | 6.48 | | |
| 17 | −14.223 | 1.20 | 1.77250 | 49.62 |
| 18 | −40.331 | | | | where * represents an aspherical surface, Z1 ranges from 3.8905 mm to 9.2460 mm, and Z2 ranges from 8.8773 mm to 1.0000 mm during zooming.

According to the second example of the present invention, the coefficients of the aspherical seventh lens surface is described by the above formula using the aspherical coefficients shown in Table 4.

TABLE 4

| | aspherical coefficients of the seventh surface |
|---|---|
| K | −0.9778951816736E + 2 |
| A4 | 0.1133423110846E − 3 |
| A6 | 0.2454643376035E − 6 |
| A8 | 0.6447970259949E − 8 |
| A10 | −0.4312734797238E − 10 |

FIGS. 4A and 4B illustrate the superior aberration characteristics of the second example, at a wide-angle position and a telephoto position, respectively.

Values for a third example consistent with the present invention (see FIG. 5) are shown in Table 5, where: the focal length f ranges from 36.200 mm to 77.246 mm; the half viewing angle ω ranges from 31.13° to 15.51°; the back focal length fb ranges from 5.998 mm to 44.472 mm; and the F number ranges from 2.88 to 5.71.

TABLE 5

| Surface Number | radius of curvature $r_i$ | distance $d_i$ | refractive power nd | Abbe number v |
|---|---|---|---|---|
| 1 | −21.379 | 2.00 | 1.84666 | 23.78 |
| 2 | −32.461 | 0.10 | | |
| 3 | −202.664 | 2.78 | 1.56907 | 71.30 |
| 4 | −24.580 | Z1 | | |
| 5 | −28.782 | 0.80 | 1.61272 | 58.58 |
| 6 | 10.106 | 4.82 | 1.81474 | 37.03 |
| *7 | 159.131 | 0.97 | | |
| 8 | −42.734 | 3.24 | 1.80610 | 33.27 |
| 9 | −158.911 | 0.15 | | |
| 10 | 175.836 | 3.69 | 1.56384 | 60.83 |
| 11 | −25.101 | 1.31 | | |
| 12 | ∞ | 5.12 | 1.56907 | 71.30 |
| 13 | −11.857 | 1.00 | 1.84666 | 23.78 |

TABLE 5-continued

| Surface Number | radius of curvature $r_i$ | distance $d_i$ | refractive power nd | Abbe number v |
|---|---|---|---|---|
| 14 | −19.101 | Z2 | | |
| 15 | −124.396 | 2.31 | 1.84666 | 23.78 |
| 16 | −36.704 | 0.12 | | |
| 17 | −83.295 | 1.20 | 1.772250 | 49.62 |
| 18 | 43.278 | 8.72 | | |
| 19 | −17.456 | 1.20 | 1.64000 | 60.20 |
| 20 | −46.384 | | | | where * represents an aspherical surface, Z1 ranges from 4.3397 mm to 11.6867 mm, and Z2 ranges from 12.0965 mm to 1.0000 mm during zooming.

According to the third example of the present invention, the coefficients of the aspherical seventh lens surface is described by the above formula using the aspherical coefficients shown in Table 6.

TABLE 6

| aspherical coefficients of the seventh surface | |
|---|---|
| K | 0.4744974863751E + 2 |
| A4 | 0.5733419000160E − 4 |
| A6 | 0.1398055709659E − 6 |
| A8 | 0.1115031642326E − 8 |
| A10 | 0.7610090764734E − 12 |

FIGS. 6A and 6B illustrate the superior aberration characteristics of the third example, at a wide-angle position and a telephoto position, respectively.

Values for a fourth example consistent with the present invention (see FIG. 7) are shown in Table 7, where: the focal length f ranges from 39.127 mm to 87.010 mm; the half viewing angle ω ranges from 29.19° to 13.81°; the back focal length fb ranges from 7.828 mm to 52.292 mm; and the F number ranges from 2.90 to 5.79.

TABLE 7

| Surface Number | radius of curvature $r_i$ | distance $d_i$ | refractive power nd | Abbe number v |
|---|---|---|---|---|
| 1 | −27.400 | 1.81 | 1.84666 | 23.78 |
| 2 | −41.385 | 0.10 | | |
| 3 | −721.800 | 2.09 | 1.56907 | 71.30 |
| 4 | −32.703 | Z1 | | |
| 5 | −34.608 | 0.80 | 1.62299 | 58.12 |
| 6 | 10.157 | 4.80 | 1.81474 | 37.03 |
| *7 | 100.000 | 1.81 | | |
| 8 | −32.740 | 4.00 | 1.67270 | 33.17 |
| 9 | −82.622 | 0.15 | | |
| 10 | 275.667 | 3.11 | 1.583313 | 59.46 |
| 11 | −27.255 | 0.12 | | |
| 12 | −519.100 | 4.71 | 1.56907 | 71.30 |
| 13 | −12.466 | 1.08 | 1.84666 | 23.78 |
| 14 | −20.142 | Z2 | | |
| 15 | −1850.000 | 2.64 | 1.84666 | 23.78 |
| 16 | −45.110 | 0.25 | | |
| 17 | −180.784 | 1.20 | 1.80420 | 46.50 |
| 18 | 43.880 | 7.44 | | |
| 19 | −19.567 | 1.20 | 1.80420 | 46.50 |
| 20 | −51.071 | | | | where * represents an aspherical surface, Z1 ranges from 4.5881 mm to 18.2995 mm, and Z2 ranges from 15.2116 mm to 1.0059 mm during zooming.

According to the fourth example of the present invention, the coefficients of the aspherical seventh lens surface is described by the above formula using the aspherical coefficients shown in Table 8.

TABLE 8

| aspherical coefficients of the seventh surface | |
|---|---|
| K | 0.6181022751642E + 1 |
| A4 | 0.5124086557354E − 4 |
| A6 | 0.7661427250000E − 7 |
| A8 | 0.1933346358038E − 8 |
| A10 | −0.6058939911601E − 11 |

FIGS. 8A and 8B illustrate the superior aberration characteristics of the fourth example, at a wide-angle position and a telephoto position, respectively.

Values for a fifth example consistent with the present invention (see FIG. 9) are shown in Table 9, where; the focal length ranges from 28.998 mm to 58.196 mm; the half viewing angle ω ranges from 37.07° to 20.16°; the back focal length fb ranges from 5.999 mm to 33.143 mm; and the F number ranges from 2.90 to 5.51.

TABLE 9

| Surface Number | radius of curvature $r_i$ | distance $d_i$ | refractive power nd | Abbe number v |
|---|---|---|---|---|
| 1 | −18.522 | 1.84 | 1.84666 | 23.78 |
| 2 | −30.398 | 0.10 | | |
| 3 | −160.783 | 2.20 | 1.56907 | 64.08 |
| 4 | −20.368 | Z1 | | |
| 5 | −21.502 | 0.80 | 1.62041 | 60.34 |
| 6 | 8.200 | 3.95 | 1.81474 | 33.64 |
| *7 | 200.000 | 0.84 | | |
| 8 | −37.168 | 1.00 | 1.80610 | 33.27 |
| 9 | ∞ | 0.37 | | |
| 10 | 99.645 | 2.03 | 1.58913 | 61.25 |
| 11 | −17.992 | 0.31 | | |
| 12 | −50.955 | 5.44 | 1.59240 | 65.87 |
| 13 | −8.437 | 1.20 | 1.84666 | 23.78 |
| 14 | −13.557 | Z2 | | |
| 15 | −60.633 | 1.98 | 1.84666 | 23.78 |
| 16 | −27.158 | 0.12 | | |
| 17 | −95.934 | 1.20 | 1.69680 | 55.46 |
| 18 | 37.371 | 6.40 | | |
| 19 | −14.269 | 1.20 | 1.77250 | 49.62 |
| 20 | −44.589 | 5.99 | | |

According to the fifth-example of the present invention, the coefficients of the aspherical seventh lens surface is described by the above formula using the aspherical coefficients shown in Table 10.

TABLE 10

| aspherical coefficients of the seventh surface | |
|---|---|
| K | 0.1000000000000E + 3 |
| A4 | 0.1288648941024E − 3 |
| A6 | 0.4642582239521E − 6 |
| A8 | 0.3933220568659E − 8 |
| A10 | 0.2034355282422E − 11 |

Figure 10B:
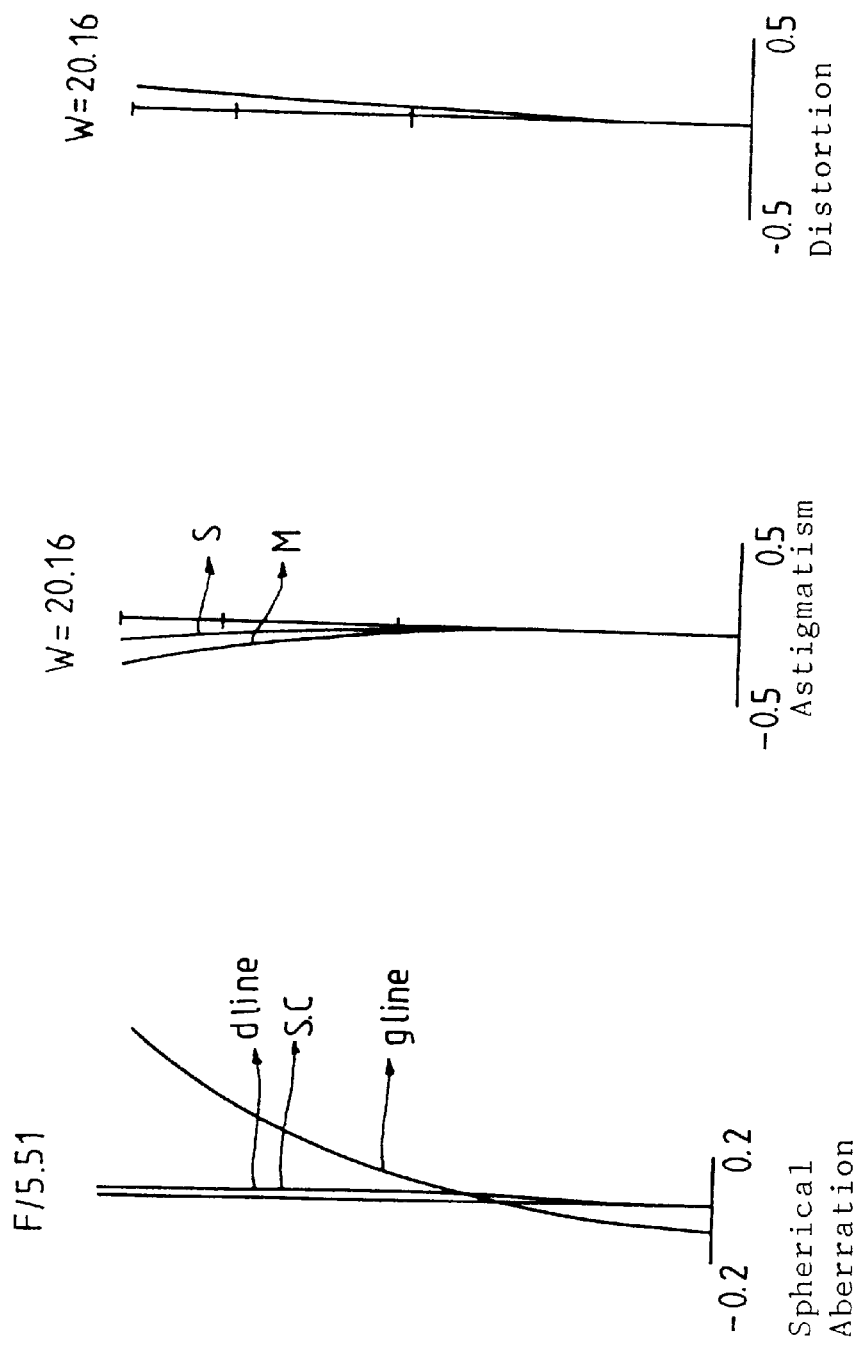
Figure 11A:
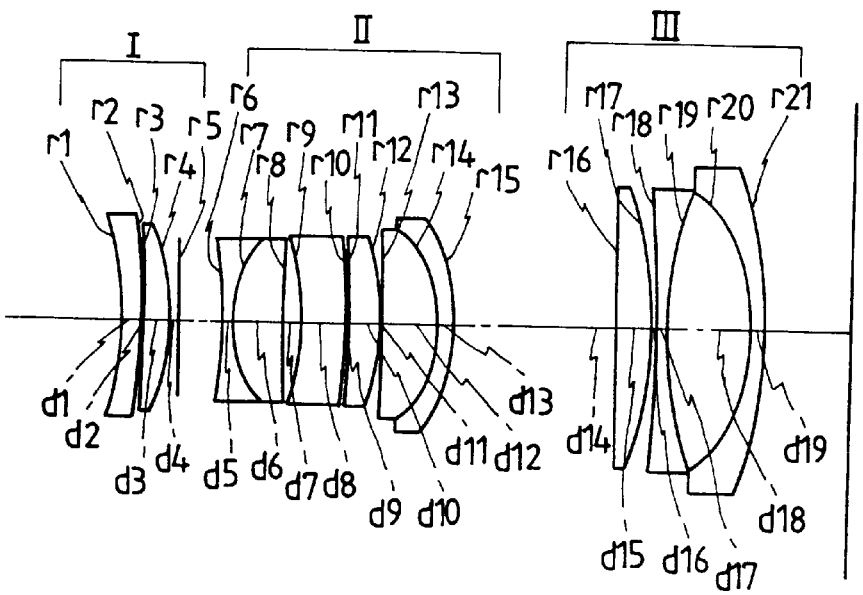
FIGS. 11A and 11B are schematic sectional views of a fast zoom lens system at a wide-angle position and at a telephoto position, respectively, in accordance with a sixth example of the present invention.
Figure 11B:
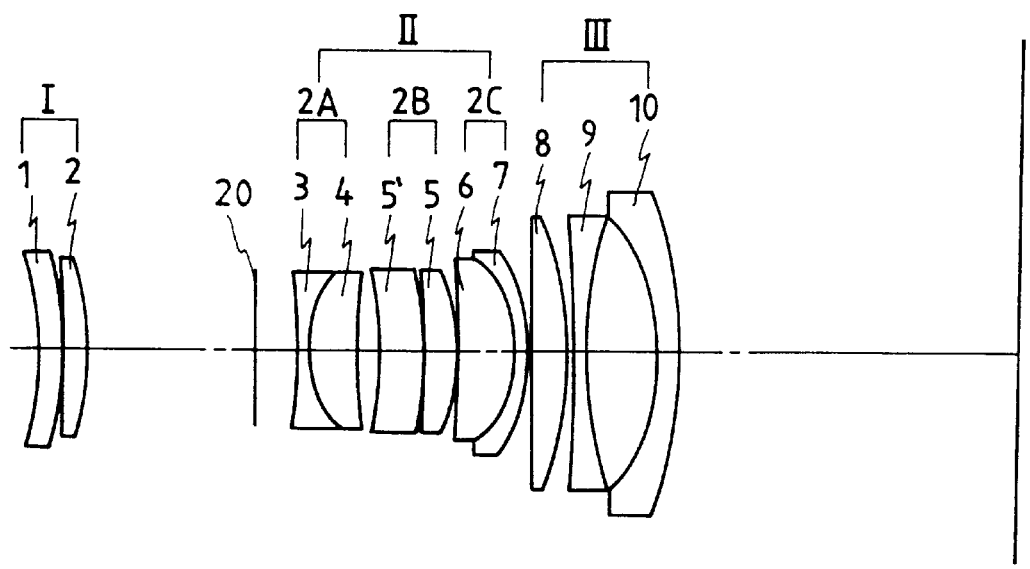

FIGS. 10A and 10B illustrate the superior aberration characteristics of the fifth example, at a wide-angle position and a telephoto position, respectively.

Values for a sixth example consistent with the present invention (see FIG. 11) are shown in Table 11, where: the focal length f ranges from 39.146 mm to 86.952 mm; the half viewing angle ω ranges from 29.18° to 13.82°; the back length fb ranges from 7.794 mm to 52.082 mm; and the F number ranges from 2.90 to 5.78.

TABLE 11

| Surface Number | radius of curvature $r_i$ | distance $d_i$ | refractive power nd | Abbe number v |
|---|---|---|---|---|
| 1 | −26.540 | 1.82 | 1.75520 | 27.53 |
| 2 | −42.500 | 0.10 | | |
| 3 | 1140.300 | 2.06 | 1.49700 | 81.60 |
| 4 | −30.480 | Z1 | | |
| 5 | aperture | 3.87 | | |
| 6 | −34.954 | 0.80 | 1.62280 | 56.91 |
| *7 | 10.000 | 4.58 | 1.81474 | 37.03 |
| 8 | 106.232 | 1.72 | | |
| 9 | −31.538 | 3.91 | 1.69895 | 30.05 |
| 10 | −91.100 | 0.15 | | |
| 11 | 469.100 | 2.87 | 1.69680 | 55.46 |
| 12 | −27.390 | 0.12 | | |
| 13 | −331.570 | 5.14 | 1.49700 | 81.61 |
| 14 | −11.925 | 1.08 | 1.84666 | 23.78 |
| 15 | −17.888 | Z2 | | |
| 16 | −1215.000 | 2.64 | 1.84666 | 23.78 |
| 17 | −45.000 | 0.47 | | |
| 18 | −199.670 | 1.40 | 1.80420 | 46.50 |
| 19 | 42.797 | 6.62 | | |
| 20 | −19.423 | 1.50 | 1.80420 | 46.50 |
| 21 | −51.006 | | | |

According to the sixth example of the present invention, the coefficients of the aspherical eight lens surface is described by the above formula using the aspherical coefficients shown in Table 12.

TABLE 12

| | aspherical coefficients of the eighth surface |
|---|---|
| K | 0.1034823749952E + 1 |
| A4 | 0.5413655228933E − 4 |
| A6 | 0.7125278171612E − 7 |
| A8 | 0.2133215410425E − 8 |
| A10 | −0.8454640613039E − 11 |

FIGS. 12A and 2B illustrate the superior aberration characteristics of the sixth example, at a wide-angle position and a telephoto position, respectively.

Figure 13A:
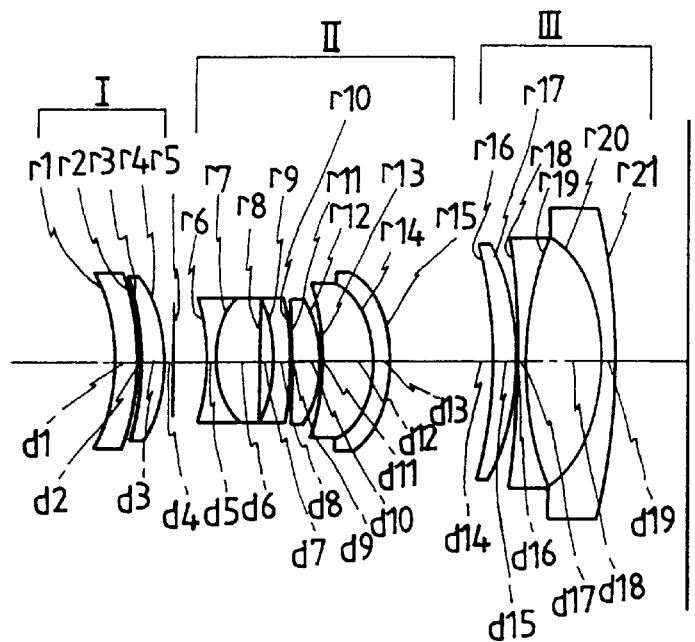
FIGS. 13A and 13B are schematic sectional views of a fast zoom lens system at a wide-angle position and at a telephoto position, respectively, in accordance with a seventh example of the present invention.
Figure 13B:
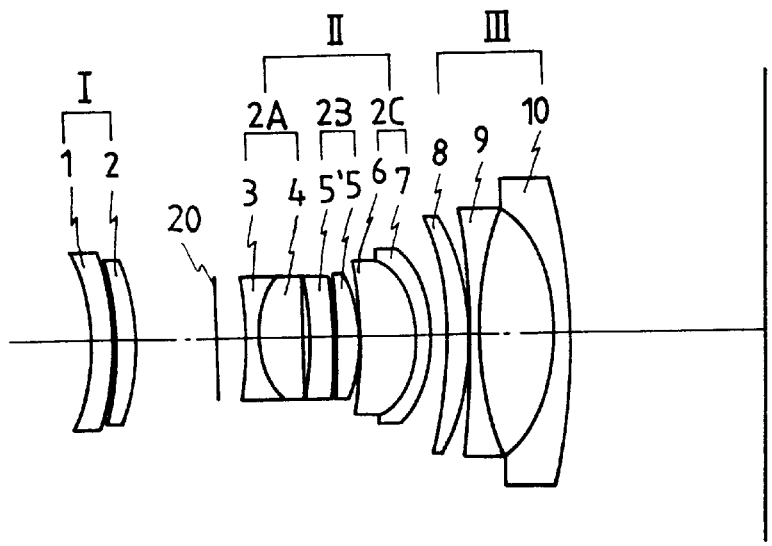

Values for a seventh example consistent with the present invention (see FIG. 13) are shown in Table 13, where: the focal length f ranges from 29.005 mm to 58.210 mm; the half viewing angle ω ranges from 37.01° to 20.16°; the back focal length fb ranges from 5.999 mm to 34.711 mm; and the F number ranges from 2.90 to 5.53.

TABLE 13

| Surface Number | radius of curvature $r_i$ | distance $d_i$ | refractive power nd | Abbe number v |
|---|---|---|---|---|
| 1 | −18.208 | 1.59 | 1.80518 | 25.46 |
| 2 | −26.649 | 0.10 | | |
| 3 | −78.298 | 2.20 | 1.49700 | 81.61 |
| 4 | −19.381 | Z1 | | |
| 5 | aperture | 2.64 | | |
| 6 | −21.393 | 0.80 | 1.62280 | 56.91 |
| 7 | 8.172 | 3.92 | 1.81474 | 37.03 |
| *8 | −155.362 | 0.73 | | |
| 9 | −30.231 | 1.67 | 1.72342 | 37.99 |
| 10 | 71.756 | 0.11 | | |
| 11 | 52.150 | 2.28 | 1.61800 | 63.39 |
| 12 | −17.330 | 0.12 | | |
| 13 | −85.509 | 5.23 | 1.49700 | 81.61 |
| 14 | −8.449 | 1.20 | 1.84666 | 23.78 |
| 15 | −12.157 | Z2 | | |
| 16 | −45.641 | 1.85 | 1.84666 | 23.78 |
| 17 | −26.070 | 0.12 | | |
| *18 | −153.453 | 1.20 | 1.62299 | 58.12 |

TABLE 13-continued

| Surface Number | radius of curvature $r_i$ | distance $d_i$ | refractive power nd | Abbe number v |
|---|---|---|---|---|
| 19 | 34.213 | 6.59 | | |
| 20 | −15.305 | 1.20 | 1.69680 | 55.46 |
| 21 | −61.071 | | | | where * represents an aspherical surface, Z1 ranges from 1.0924 mm to 7.2598 mm, and Z2 ranges from 9.4057 mm to 1.1853 mm during zooming.

According to the seventh example of the present invention, the coefficients of the aspherical eighth lens surface and the aspherical eighteenth lens surface are described by the above formula using the aspherical coefficients shown in Table 14.

TABLE 14

| | Aspherical coefficients of the eighth surface | Aspherical coefficients of the eighteenth surface |
|---|---|---|
| K | 0.1924417394529E + 3 | −0.2404648558657E + 2 |
| A4 | 0.1405736526949E − 3 | −0.4053953840432E − 5 |
| A6 | 0.5934741858841E − 6 | −0.3404100951634E − 7 |
| A8 | 0.2529970914220E − 8 | 0.2900082058331E − 9 |
| A10 | 0.2221682217473E − 10 | −0.1968864010705E − 11 |

Figure 14B:
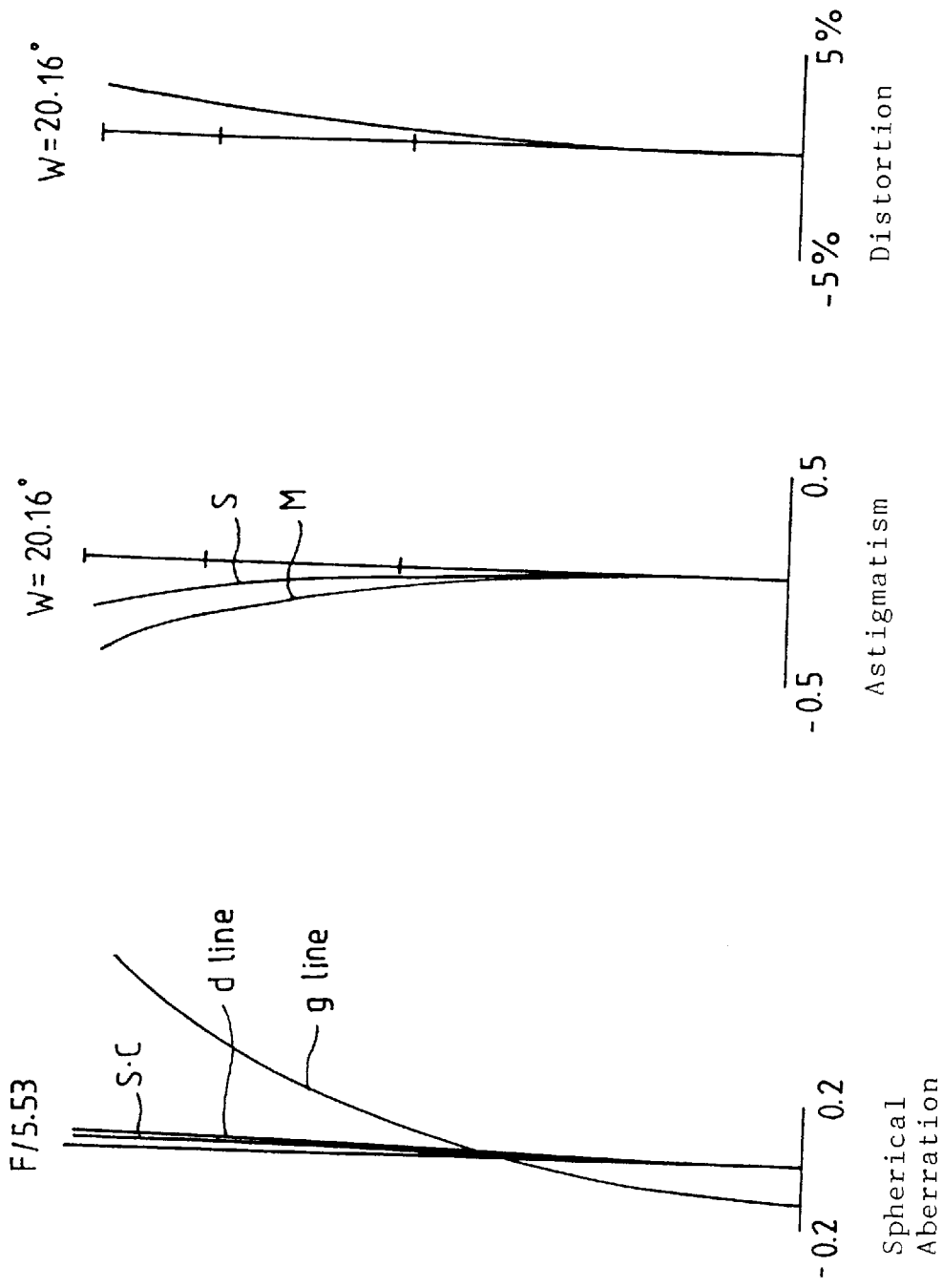
Figure 15A:
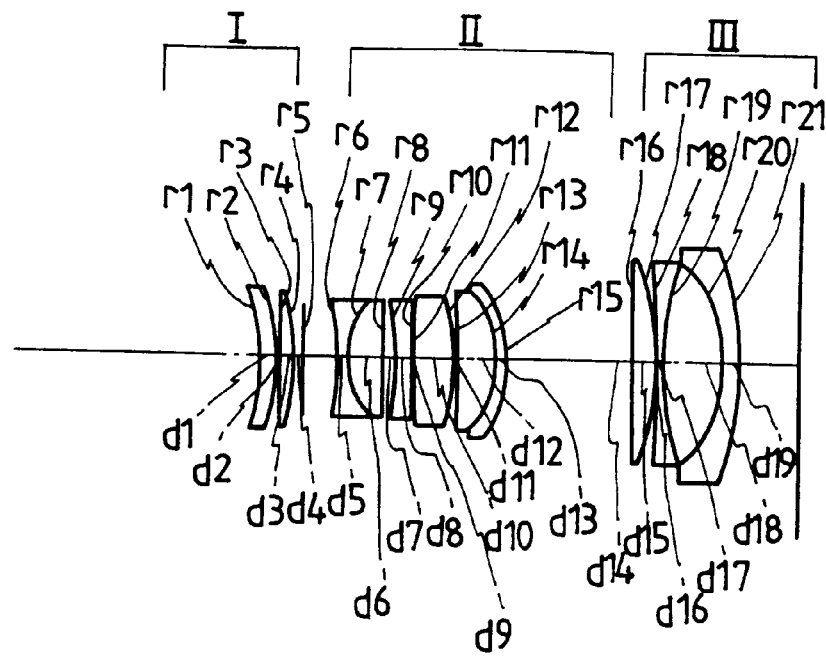
FIGS. 15A and 15B are schematic sectional views of a fast zoom lens system at a wide-angle position and at a telephoto position, respectively, in accordance with a eighth example of the present invention.
Figure 15B:
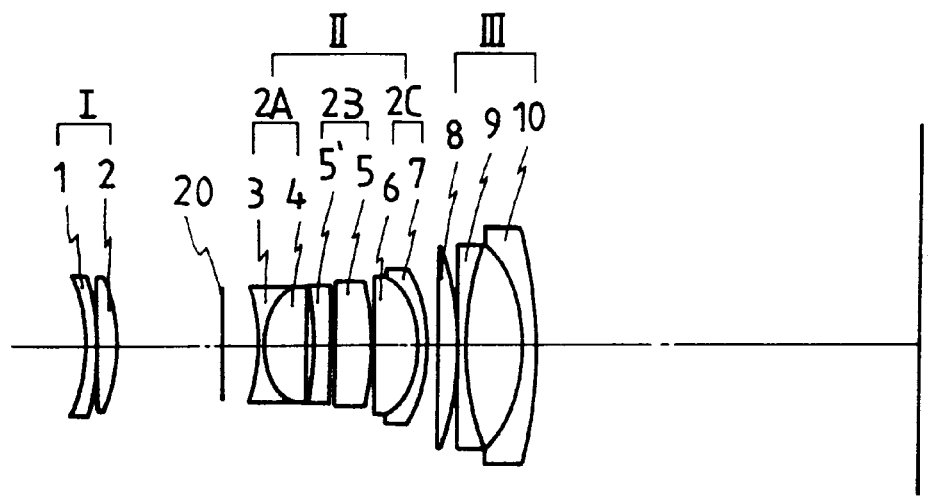

FIGS. 14A and 14B illustrate the superior aberration characteristics of the seventh example, at a wide-angle position and a telephoto position, respectively.

Values for the eighth example consistent with the present invention (see FIG. 15) are shown in Table 15, where: the focal length f ranges from 39.151 mm to 101.998 mm; the half viewing angle ω ranges from 29.19° to 11.87°; the back focal length fb ranges from 7.799 mm to 64.378 mm; and the F number ranges from 2.90 to 6.86.

TABLE 15

| Surface Number | radius of curvature $r_i$ | distance $d_i$ | refractive power nd | Abbe number v |
|---|---|---|---|---|
| 1 | −23.079 | 1.24 | 1.75520 | 27.53 |
| 2 | −36.946 | 0.10 | | |
| 3 | −460.172 | 2.22 | 1.49700 | 81.61 |
| 4 | −25.636 | Z1 | | |
| 5 | aperture | 4.46 | | |
| 6 | −23.767 | 0.80 | 1.62280 | 56.91 |
| 7 | 10.426 | 4.60 | 1.81474 | 33.64 |
| *8 | 183.480 | 1.07 | | |
| 9 | −44.482 | 2.33 | 1.67790 | 55.52 |
| 10 | −163.268 | 0.15 | | |
| 11 | 129.905 | 5.00 | 1.61800 | 63.39 |
| 12 | −25.942 | 0.12 | | |
| 13 | 323.496 | 5.18 | 1.49700 | 81.61 |
| 14 | −11.925 | 1.08 | 1.84666 | 23.78 |
| 15 | −18.549 | Z2 | | |
| 16 | ∞ | 2.68 | 1.84666 | 23.78 |
| 17 | −45.045 | 0.12 | | |
| 18 | −208.847 | 1.40 | 1.80420 | 46.50 |
| 19 | 39.665 | 6.80 | | |
| 20 | −19.405 | 1.50 | 1.80420 | 46.50 |
| 21 | −57.510 | | | | where * represents an aspherical surface, Z1 ranges from 1.0002 mm to 13.3102 mm, and Z2 ranges from 15.3002 mm to 1.0000 mm during zooming.

According to the eighth example of the present invention, the coefficients of the aspherical eighth lens surface is described by the above formula using the aspherical coefficients shown in Table 16.

TABLE 16

| | aspherical coefficients of the eighth surface |
|---|---|
| K | 0.1000000000000E + 3 |
| A4 | 0.4971736373923E − 4 |
| A6 | 0.9326790423364E − 7 |
| A8 | 0.4473904271626E − 9 |
| A10 | 0.3856681849659E − 11 |

Figure 16B:
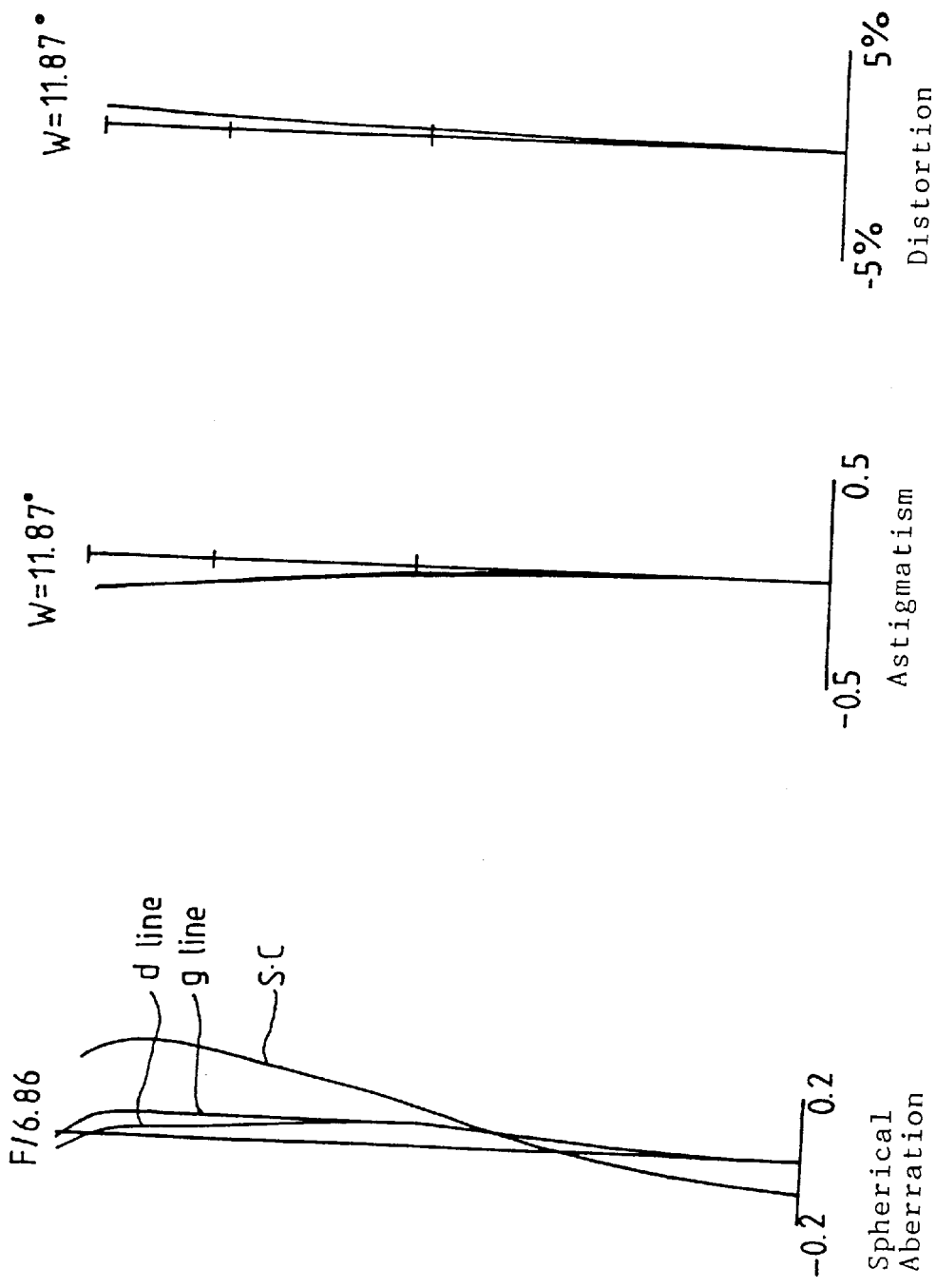

FIGS. 16A and 16B illustrate the superior aberration characteristics of the eighth example, at a wide-angle position and a telephoto position, respectively.

As described above, fast zoom lens systems consistent with the present invention have a zoom ratio of about 2.0 times and an F number of about 2.8. While preferred embodiments consistent with the present invention have been described above, it will be obvious to those skilled in the art that various changes and modification can be readily made therein without departing from the scope and sprit of the invention as defined by the appended claims.

What is claimed is:

1. A fast zoom lens system, from an object side to an image side, comprising:
a first lens group having an overall positive refractive power;
a second lens group having an overall positive refractive power;
a third lens group having an overall negative refractive power; and
wherein the first lens group, the second lens group and the third lens group move toward the object side, and wherein a distance between the first lens group and the second lens group increases while a distance between the second lens group and the third lens group decreases when zooming from a wide-angle position to a telephoto position, and wherein the fast zoom lens system satisfies the following conditions:

$0.8 < f2/fw < 1.0$ $0.40 < D2/fw < 0.65$ $1.4 < Lw/fw < 2.0$ $2.3 < f1/fw < 3.8$ where:
f2 represents a focal length of the second lens group;
fw represents a focal length of the zoom lens system at a wide-angle position;
D2 represents a distance between an entrance surface and an exit surface of the second lens groups;
Lw represents a distance between an entrance surface of the first lens group and a film plane at a wide-angle position; and
f1 represents a focal length of the first lens group.

2. The system of claim 1, wherein the following condition is satisfied:

$0.7 < |f3|/fw < 1.0$ where:
f3 represents a focal length of the third lens group.

3. The system of claim 2, wherein the following conditions are satisfied:

$0.0 < N3p - N3n < 0.2$ $-35.0 < V3p - V3n < -20$ where:
N3p represents an average refractive index of lens units having a positive refractive power in the third lens group;
N3n represents an average refractive index of lens units having a negative refractive power in the third lens group;
V3p represents an average Abbe number of lens units having a positive refractive power in the third lens group; and
V3n represents an average Abbe number of lens units having a negative refractive power in the third lens group.

4. The system of claim 1, wherein the following condition is satisfied:

$2.9 < f1 \times \{[1/(N1p \times V1p)] + [1/(N1n \times V1n)]\} < 4.5$ where:
N1p represents an average refractive index of lens units having a positive refractive power in the first lens group;
N1n represents an average refractive index of lens units having a negative refractive power in the first lens group;
V1p represents an average Abbe number of lens units having a positive refractive power in the first lens group; and
V1n represents an average Abbe number of lens units having a negative refractive power in the first lens group.

5. The system claim 1, wherein the following conditions are satisfied:

$-0.2 < N2p - N2n < 0.0$ $15.0 < V2p - V2n < 25.0$ where:
N2p represents an average refractive index of lens units having a positive refractive power in the second lens group;
N2n represents an average refractive index of lens units having a negative refractive power in the second lens group;
V2p represents an average Abbe number of lens units having a positive to refractive power in the second lens group; and
V2n represents an average Abbe number of lens units having a negative refractive power in the second lens group.

6. A fast zoom lens system, from an object side to an image side, comprising:
a first lens group having an overall positive refractive power;
a second lens group having an overall positive refractive power; and
a third lens group having an overall negative refractive power;
an aperture stop located between the first lens group and the second lens group; and
wherein the first lens group, the second lens group and the third lens group move toward the object side, and wherein a distance between the first lens group and the second lens group increases while a distance between the second lens group and the third lens group decreases when zooming from a wide-angle position to a telephoto position, and wherein the fast zoom lens system satisfies the following conditions:

$$0.7 < |f2|/fw < 1.10$$

$$0.35 < D2/fw < 0.70$$

$$1.3 < Lw/fw < 2.1$$

$$2.0 < f1/fw < 3.8$$

where:
- f2 represents a focal length of the second lens group II;
- fw represents a focal length of the zoom lens system at a wide-angle position;
- D2 represents a distance between an entrance surface and an exit surface of the second lens group;
- Lw represents a distance between an entrance surface of the first lens group and a film plane at a wide-angle position; and
- f1 represents a focal length of the first lens group I.

7. The system of claim 6, wherein the following condition is satisfied:

$$0.6 < |f3|/fw < 1.0$$

where:
- f3 represents a focal length of the third lens group.

8. The system of claim 7, wherein the following conditions are satisfied:

$$0.0 < N3p - N3n < 0.2$$

$$-35.0 < V3p - V3n < -20$$

where:
- N3p represents an average refractive index of lens units having a positive refractive power in the third lens group;
- N3n represents an average refractive index of lens units having a negative refractive power ink the third lens group;
- V3p represents an average Abbe number of lens units having a positive refractive power in the third lens group; and
- V3n represents an average Abbe number of lens units having a negative refractive power in the third lens group.

9. The system of claim 6, wherein the following condition is satisfied:

$$2.85 < f1 \times \{[1/(N1p \times V1p)] + [1/(N1n \times V1n)]\} < 4.55$$

where:
- N1p represents an average refractive index of lens units having a positive refractive power in the first lens group I;
- N1n represents an average refractive index of lens units having a negative refractive power in the first lens group I;
- V1p represents an average Abbe number of lens units having a positive refractive power in the first lens group I; and
- V1n represents an average Abbe number of lens units having a negative refractive power in the first lens group I.

10. The system claim 6, wherein the following conditions are satisfied;

$$-0.2 < N2p - N2n < 0.0$$

$$15.0 < V2p - V2n < 25.0$$

where:
- N2p represents an average refractive index of lens units having a positive refractive power in the second lens group;
- N2n represents an average refractive index of lens units having a negative refractive power in the second lens group;
- V2p represents an average Abbe number of lens units having a positive refractive power in the second lens group; and
- V2n represents an average Abbe number of lens units having a negative refractive power in the second lens group.

11. The system of claim 6, wherein the aperture stop and the second lens group move together when zooming, and wherein the aperture stop is fixed and only the second lens group moves when focusing.

12. A fast zoom lens system comprising from an object side to an image side, comprising:
- a first lens group having an overall positive refractive power;
- a second lens group having an overall positive refractive power;
- a third lens group having an overall negative refractive power;
- an aperture stop located between the first lens group and the second lens group; and
- wherein the first lens group, the second lens group and the third lens group move toward the object side, and a distance between the first lens group and the second lens group increases while a distance between the second lens group and the third lens group decreases when zooming from a wide-angle position to a telephoto position, and wherein the fast zoom lens system satisfies the following conditions:

$$r1 < 0$$

$$0.8 < f2/fw < 1.0$$

$$0.40 < D2/fw < 0.65$$

where:
- f2 represents a focal length of the second lens group;
- fw represents a focal length of the zoom lens system at a wide-angle position; and
- D2 represents a distance between an entrance surface and an exit surface of the second lens group;
- r1 represents a radius of curvature of the first lens nearest the object side of the zoom lens system.

13. The system of claim 12, wherein the following condition is satisfied:

$$0.5 < |f11/f1| < 1.0$$

where:
- f11 represents a focal length of a first lens unit of the first lens group; and
- f1 represents a focal length of the first lens group.

14. The system of claim 13, wherein the first lens group further includes:

the first lens unit having a negative refractive power; and a second lens unit having a positive refractive power.

15. A fast zoom lens system, from an object side to an image side, comprising:

a first lens group having an overall positive refractive power;

a second lens group having an overall positive refractive power, the second lens group further including:
at least one aspherical lens;

a third lens group having an overall negative refractive power;

an aperture stop is located in between the first lens group and the second lens group; and wherein the first lens group, the second lens group and the third lens group move toward the object side, and wherein a distance between the first lens group and the second lens group increases while a distance between the second lens group and the third lens group decreases when zooming from a wide-angle position to a telephoto position; and wherein the fast zoom lens system satisfies the following conditions:

$0.8 < f2/fw < 1.0$ $0.40 < D2/fw < 0.65$ where:

f2 represents a focal length of the second lens group;

fw represents a focal length of the zoom lens system at a wide-angle position; and D2 represents a distance between an entrance surface and an exit surface of the second lens group.

16. The system of claim 15, wherein the second lens group further includes:

at least one cemented lens unit comprising:
a first lens unit having a positive refractive power and an aspherical surface; and
a second lens unit having a negative refractive power; and
wherein the first and the second lens units are cemented together.

* * * * *

UNITED STATES PATENT AND TRADEMARK OFFICE
CERTIFICATE OF CORRECTION

PATENT NO. : 5,956,185
DATED : September 21, 1999
INVENTOR(S) : Geon-Mo KANG

It is certified that error appears in the above-identified patent and that said Letters Patent is hereby corrected as shown below:

Claim 1, col. 13, line 51, "groups;" should read --group;--.

Claim 4, col. 14, line 23, "N1 n" should read --N1n--.

Claim 5, col. 14, line 33, after "system", insert --of--.

Claim 6, col. 15, line 5, "0.7<f21/fw<1.10" should read --0.7<f2/fw<1.10--.

Claim 8, col. 15, line 41, "ink" should read --in--.

Claim 10, line 16, line 1, after "system", insert --of--.

Claim 10, col. 16, line 2, "satisfied;" should read --satisfied:--.

Signed and Sealed this

Twelfth Day of September, 2000

Attest:

Q. TODD DICKINSON

*Attesting Officer*      *Director of Patents and Trademarks*